United States Patent
Staggs et al.

(10) Patent No.: US 10,594,578 B1
(45) Date of Patent: *Mar. 17, 2020

(54) DIFFERENTIAL PROCESSING OF DATA STREAMS BASED ON PROTOCOLS

(71) Applicant: C/HCA, Inc., Nashville, TN (US)

(72) Inventors: Ryan Staggs, Brentwood, TN (US); Alan Scott, Franklin, TN (US); Paul Currie, Franklin, TN (US); Allison Reed, Nashville, TN (US); Grant Thomas Obersteadt, Nashville, TN (US)

(73) Assignee: C/HCA, Inc., Nashville, TN (US)

( * ) Notice: Subject to any disclaimer, the term of this patent is extended or adjusted under 35 U.S.C. 154(b) by 372 days.

This patent is subject to a terminal disclaimer.

(21) Appl. No.: 15/369,434

(22) Filed: Dec. 5, 2016

Related U.S. Application Data

(63) Continuation of application No. 14/843,747, filed on Sep. 2, 2015, now Pat. No. 9,525,606.

(60) Provisional application No. 62/045,945, filed on Sep. 4, 2014, provisional application No. 62/079,862, filed on Nov. 14, 2014, provisional application No. 62/213,432, filed on Sep. 2, 2015.

(51) Int. Cl.
*H04L 12/26* (2006.01)
*H04L 29/06* (2006.01)

(52) U.S. Cl.
CPC ............ *H04L 43/06* (2013.01); *H04L 43/028* (2013.01); *H04L 43/067* (2013.01); *H04L 65/608* (2013.01)

(58) Field of Classification Search
CPC ... H04L 12/2803; H04L 43/06; H04L 43/067; H04L 43/028; H04L 67/22; G06F 11/34
See application file for complete search history.

(56) References Cited

U.S. PATENT DOCUMENTS

| | | |
|---|---|---|
| 2002/0128925 A1 | 9/2002 | Angeles |
| 2006/0168170 A1 | 7/2006 | Korzeniowski |
| 2007/0230486 A1 | 10/2007 | Zafirov |
| 2014/0201315 A1 | 7/2014 | Jacob et al. |
| 2015/0312127 A1 | 10/2015 | Leemet et al. |

*Primary Examiner* — Aaron N Strange
(74) *Attorney, Agent, or Firm* — Kilpatrick Townsend & Stockton LLP

(57) ABSTRACT

This disclosure relates to the processing of data streams. More specifically, application of particular protocols to a stream and a detection analysis facilitate a selective, reliable and efficient transmission of pertinent stream data to destination addresses.

20 Claims, 14 Drawing Sheets

DIFFERENTIAL PROCESSING OF DATA STREAMS BASED ON PROTOCOLS

CROSS-REFERENCE TO RELATED APPLICATIONS

This application is a continuation of U.S. patent application Ser. No. 14/843,747 filed Sep. 2, 2015, which claims the benefit of and priority to U.S. Provisional Application Nos. 62/045,945, filed on Sep. 4, 2014; 62/079,862, filed on Nov. 14, 2014; and 62/213,432, filed on Sep. 2, 2015. Each of these applications is hereby incorporated by reference in its entirety for all purposes.

FIELD

This disclosure relates to the processing of data streams. More specifically, application of particular protocols to a stream and a detection analysis facilitate a selective, reliable and efficient transmission of pertinent stream data to destination addresses.

BACKGROUND

An increasing amount of data is becoming available to collectively process and use to detect particular events. Though the increased data quantity provides immense power, it also presents difficulties. Capabilities to store and/or process data may be limited at various systems within a network. Systems may face competing aims of attempting to reliably store and/or transmit pertinent data while processing massive amounts of steam data with minimal delay.

SUMMARY

In some embodiments, a stream processing system is provided for processing data streams in accordance with protocols so as to selectively cache and transmit data to destination addresses. An input interface receives one or more data streams, each data stream of the one or more data streams having been transmitted by a source and including a plurality of data elements. A scheduler, for a data stream of the one or more data streams: detects that a report protocol that applies to the data stream based on the source of the data stream; and assigns the data stream to one or more processing nodes based on the report protocol. The one or more processing nodes, for each of the plurality of data elements in the data stream: determines, during streaming of the data stream, whether the data element includes a particular composite as specified in the report protocol and, when it is determined that the data element includes the particular composite, determines, during streaming of the data stream, whether the data element includes a value associated with the particular composite that is consistent with one or more values specified in the report protocol. The one or more processing nodes further, when it determined that the data element includes a value associated with the particular composite that is consistent with the one or more values, caches information associated with the data element. A reporting node detects one or more reporting triggers that are specified in the report protocol; and retrieves, from the cache and for each of the plurality of data elements for which it was determined that the data element includes a value associated with the particular composite that is consistent with the one or more values, the information that is associated with data element. The reporting node further identifies a destination address indicated in the report protocol; and transmits, to the destination address, the retrieved information.

In some embodiments, a method is provided for processing data streams in accordance with protocols so as to selectively cache and transmit data to destination addresses. One or more data streams are received. Each data stream of the one or more data streams had been transmitted by a source and including a plurality of data elements. For a data stream of the one or more data streams: a detection is made that a report protocol that applies to the data stream based on the source of the data stream; and the data stream is assigned to one or more processing nodes based on the report protocol. For each of the plurality of data elements in the data stream: it is determined, during streaming of the data stream, whether the data element includes a particular composite as specified in the report protocol. When it is determined that the data element includes the particular composite, it is determined, during streaming of the data stream, whether the data element includes a value associated with the particular composite that is consistent with one or more values specified in the report protocol. When it determined that the data element includes a value associated with the particular composite that is consistent with the one or more values, information associated with the data element is cached. One or more reporting triggers that are specified in the report protocol are detected. The information that is associated with data element is retrieved from the cache and for each of the plurality of data elements for which it was determined that the data element includes a value associated with the particular composite that is consistent with the one or more values. A destination address indicated in the report protocol is identified. The retrieved information is transmitted to the destination address.

In some embodiments, a computer program product is provided that is tangibly embodied in a non-transitory machine-readable storage medium. The computer program product includes instructions configured to cause one or more data processors to perform actions including part or all of a method disclosed herein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1A:
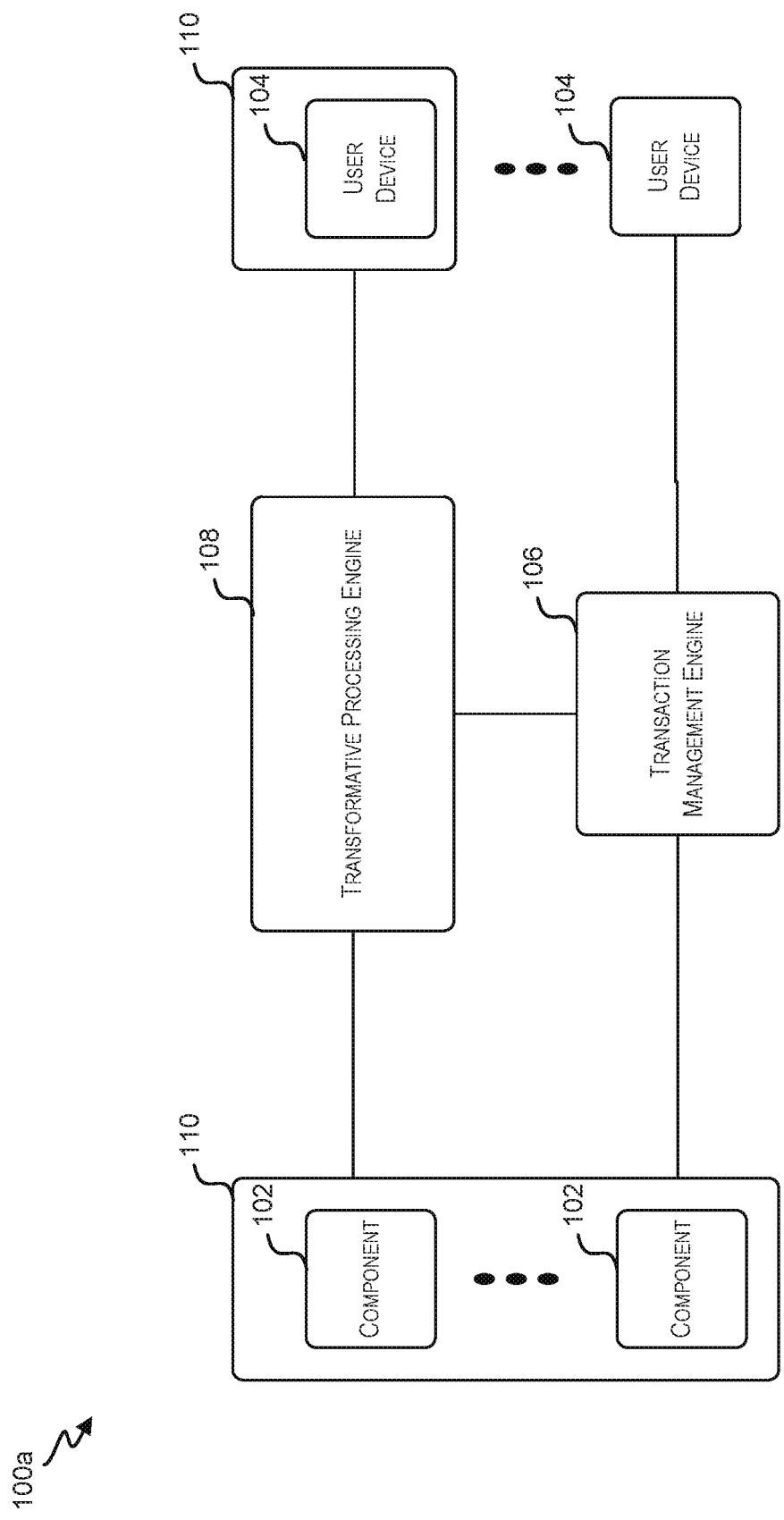
FIGS. 1A and 1B show block diagrams of embodiments of an interaction systems.

Referring first to FIG. 1A, a block diagram of an embodiment of an interaction system 100a is illustrated. Generally, in interaction system 100a, data can be generated at one or more system components 102 and/or user devices 104. Transaction management engine 106 van manage the flow of communications within interaction system. Transformative processing engine 108 can receive, intercept, track, integrate, process and/or store such data.

Data flowing in interaction system 100a can include a set of communications. Each of one, some or all communications can include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include protected information.

For example, a system component 102 can include, for example, a sensor to detect a sensor measurement and can thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity.

The identifier can be determined, for example, based on detection of a nearby electronic tag (e.g., RFID tag), a detected user input received at a user interface of component 102 and/or data in a corresponding communication received from a user device.

As another example, a user device 104 can be configured to detect user input received at a user interface of the device. The user input can include, for example, an identifier of an object or entity, an instruction, a characterization of an object or entity, an identification of an assessment to be performed, a specification of an aggregation or data processing to be performed, and/or an identification of a destination for a data-analysis report. User device 104 can further be configured to detect user input requesting particular data, to generate a request communication (e.g., to be sent to transformative processing engine), to receive the requested data and/or to present the received data.

Data can include information that identifies a person, such as personal information and/or demographic information. For example, the information can identify a person's name, age, sex, race, physical address, phone number, email address and/or social security number. Data may include information collected by a government agent, employer, insurer, or school or university, that relates to a past, present, or future condition or status (e.g., pertaining to employment, political involvement, occupation, health, or financial status) of any individual. For example, data may include information about past events.

Data may identify an entity being evaluated and/or one at least partly performing an evaluation. For example, a communication may identify a first company as one being evaluated and a second company as one evaluating a quality of a product of the first company. As another example, a communication may identify a first service plan of a first company as one providing an Internet network and may identify one or more users providing speed checks over the network.

The depicted engines, devices and/or components can communicate over one or more networks. A network of one or more networks can include a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 102 and one or more user devices 104 are illustrated as communicating via transformative processing engine 108 and/or transaction management engine 106, this specification is not so limited. For example, each of one or more components 102 may communicate with each of one or more user devices 104 directly via other or the same communication networks.

A component 102 can be configured to detect, process and/or receive data, such as environmental data, geophysical data, biometric data, chemical data (e.g., chemical composition or concentration analysis data), and/or network data. The data can be based on data detected, for example, via a sensor, received signal or user input. A user device 104 can include a device configured to receive data from a user and/or present data to a user. It will be appreciated that, in some instances, a component 102 is also a user device 104 and vice-versa. For example, a single device can be configured to detect sensor measurements, receive user input and present output.

A component 102 can be configured to generate a communication that is in one or more formats, some of which can be proprietary. For example, an imaging machine (e.g., one of one or more components 102) manufactured by company A, located within a first facility (e.g., facility 110), and belonging to a first client, may save and transfer data in a first format. An imaging machine (e.g., one of one or more components 102) manufactured by company B, located within the first facility (e.g., facility 110), and belonging to the first client, may save and transfer data in a second format. In some examples, data from certain components is transformed, translated, or otherwise adjusted to be recognizable by transformative processing engine 108. Thus, continuing with the example from above, when the imaging machines manufactured by companies A and B are located within the first facility belonging to the first client, they may nevertheless save and transfer data in different formats. In some examples, one or more components 102 communicate using a defined format.

In some examples, each of one or more components 102 are each associated with one or more clients within a same or different interaction systems. For example, certain ones of one or more components 102 may be associated with a first client, while other ones of one or more components 102 may be associated with a second client. Additionally, each of one or more components 102 may be associated with a facility 110 (e.g., client facility). Each facility 110 may correspond to a single location and/or processing focus. Exemplary types of facilities include server farm facilities, web-server facilities, data-storage facilities, technical-support facilities, telecommunication facilities, care facilities and/or business operation facilities. For example, a first facility may include a structure at a first location at which one or more resources (e.g., computational resources, equipment resources, laboratory resources and/or human resources) are provided. Each of the one or more resources may be of a first type in a first set of types. A resource type can be identified based on, for example, a characteristic of the resource (e.g., sensor inclusion) and/or a capability of providing each of one or more services. Thus, for example, resources at a first facility may be better configured for handling a particular type of service requests compared to those in another facility. As another examples, different facilities may include resources of similar or same types but may vary in terms of, for example, user accessibility, location, managing client, etc.

Transmission of data from one or more components 102 to transformative processing engine 108 may be triggered by a variety of different events. For example, the data may be transmitted periodically, upon detection of an event (e.g., completion of an analysis or end of a procedure), upon detection of an event defined by a rule (e.g., a user-defined rule), upon receiving user input triggering the transmission, or upon receiving a data request from transformative processing engine 108. Each transmission can include, e.g., a single record pertaining to a single entity, object, procedure, or analysis or multiple records pertaining to multiple entities, objects, procedures, or analyses.

In some examples, at least some of one or more user devices 104 are associated with facility 110. In some examples, at least some of one or more user devices 104 need not be associated with facility 110 or any other facility. Similar to one or more components 102, one or more user devices 104 may be capable of receiving, generating, processing and/or transmitting data. Examples of one or more user devices 104 include, for example, a computer, a mobile device, a smart phone, a laptop, an electronic badge, a set-top box, a thin client device, a tablet, a pager, and other similar user devices). One or more user devices 104 may be configured to run one or more applications developed for interacting with data collected by transformative processing engine 108. For example, those user devices of one or more user devices 104 that are not associated with facility 110 may be configured to run one or more third-party applications that may rely in part on the data gathered by transformative processing engine 108.

Each of one or more components 102 and one or more user devices 104 may be utilized by one or more users (not shown). Each of the one or more users may be associated with one or more clients. For example, one of the one or more users can be associated with a client as a result of being employed by the client, physically located at a location of the client, being an agent of the client or receiving a service from the client.

In some examples, one or more components 102 and one or more user devices 104 may communicate with transformative processing engine 108 and transaction management engine 106 via different information formats, different proprietary protocols, different encryption techniques, different languages, different machine languages, and the like. As will be discussed with reference to FIG. 2, transformative processing engine 108 is configured to receive these many different communications from one or more components 102, and in some examples from one or more user devices 104, in their native formats and transform them into any of one or more formats. The received and/or transformed communications can be transmitted to one or more other devices (e.g., transaction management engine 106, an entity device and/or a user device) and/or locally or remotely stored. In some examples, transformative processing engine 108 receives data in a particular format (e.g., the HL7 format) or conforming to any other suitable format and/or is configured to transform received data to conform with the particular format.

One or more components 102 of facility 110 can include and/or has access to a local or remote memory for storing generated data. In some examples, the data is stored by one or more servers local to facility 110. Such storage may enable facility 110 to retain locally data pertaining to its facility prior to (or in conjunction with) the data being shared with transformative processing engine 108 and/or transaction management engine 106. In some examples, the one or more servers of facility 110 share data directly with a record service (not shown), and the record service makes the data available to transformative processing engine 108 and/or transaction management engine 106. Once an electronic record is updated at facility 110, an indication of the update may be provide to the record service. The record service may then update a corresponding record associated with the electronic record.

The record service can be granted access to the data generated and/or transmitted by one or more components 102. In some examples, the record service includes a server or a plurality of servers arranged in a cluster or the like. These server(s) of the record service can process and/or store data generated by one or more components 102. For example, one or more records can be generated for each entity (e.g., each record corresponding to a different entity or being shared across entities). Upon receiving a communication with data from an component (or facility), the record service can identify a corresponding record and update the record to include the data (or processed version thereof). In some examples, the record service provides data to transformative processing engine 108.

Facility 110 can include one at which a resource is located and/or service is provided. Irrespective of the type of facility, facility 110 may update data, maintain data, and communicate data to transformative processing engine 108. At least some of the data may be stored local to facility 110.

A user interacting with a user device 104 can include, for example, a client customer, client agent and/or a third party. A user may interact with user device 104 and/or component 102 so as to, for example, facilitate or initiate data collection (e.g., by a component 102), provide data, initiate transmission of a data request, access data and/or initiate transmission of a data-processing or data-storage instruction. In some instances, one or more user devices 104 may operate according to a private and/or proprietary network or protocols. In other examples, one or more user devices 104 may operate on public networks. In any case, however, transformative processing engine 108 can have access to the one or more components and can communicate with them via a public, private and/or proprietary network or protocols. The use of one or more private and/or proprietary protocols can promote secure transfer of data.

Figure 1B:
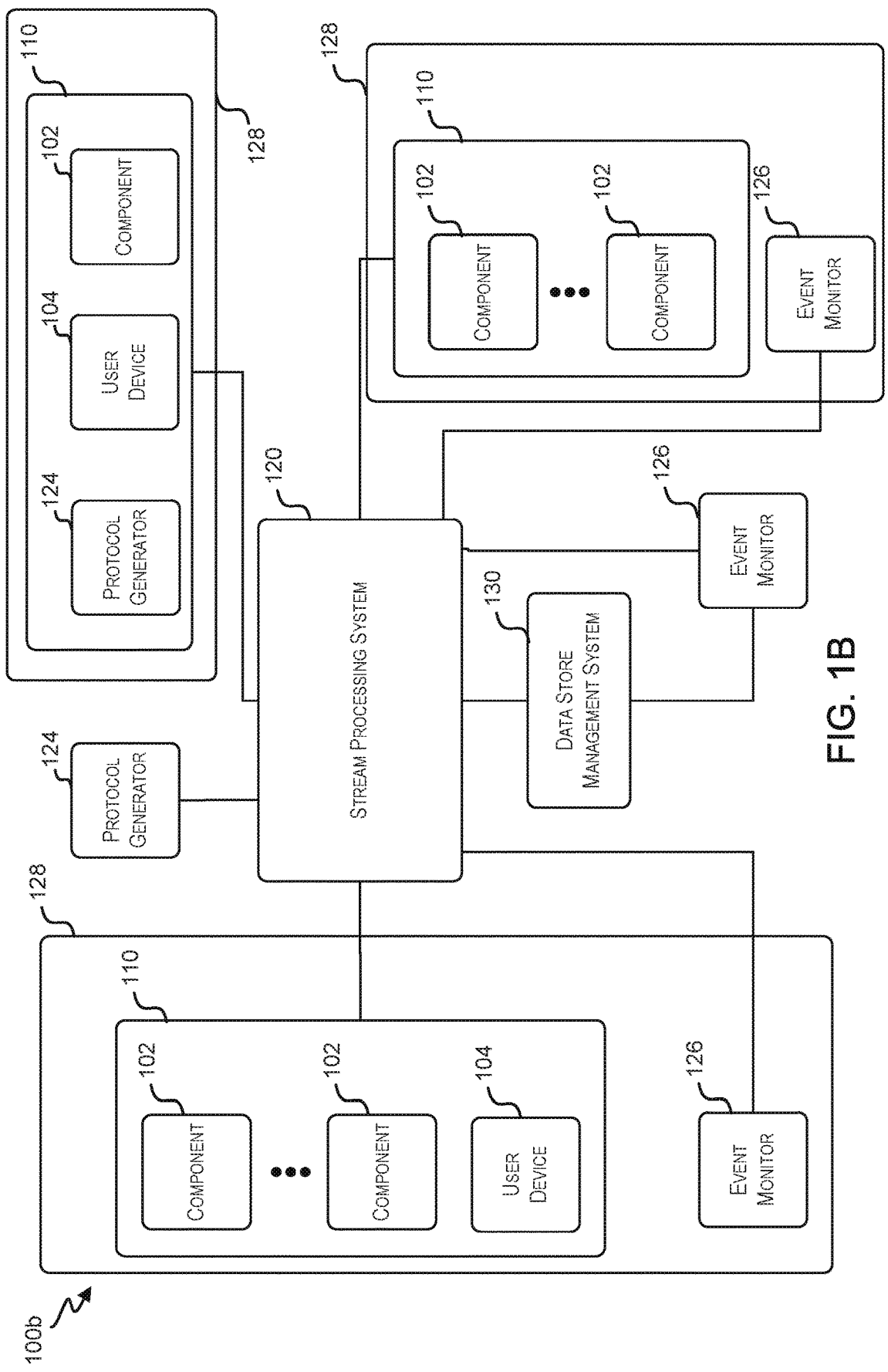

Referring next to FIG. 1B, a block diagram of an embodiment of an interaction system 100b is illustrated. Generally, in interaction system 100b, data can be generated at one or more system components 102 and/or user devices 104. Data from various components and/or user devices 104 can be included in one or more data streams transmitted to a stream processing system 120.

In some instances, data collected (e.g., via sensors or user interface components) at a component 102 and/or user device 104 can immediately, or with some delay (e.g., so as to be at an end of a data-collection effort) appended to a data stream transmitted directly or indirectly to stream processing system 120. In some instances, collected data can be locally or remotely stored and subsequently retrieved (e.g., by a same or different device) to append to a stream. For example, a set of components 102 and/or user devices 104 may collect and/or generate data and then store the data. A managing server may then, at a defined time or upon detecting a defined type of event (e.g., receiving a data request or detecting a threshold size of a data stream), retrieve the stored data and append the data (e.g., in raw or processed form) to a stream. Thus, a source of a stream may be a single component or user device or an intermediate device or system that collects data from multiple components and/or user devices.

Data included in streams may include data collected (e.g., via sensors or an input interface that detects, for example, verbal, typed or cursor inputs) and/or other data. For example, the other data may include information and/or an identifier of a facility, a time, a location, a title of an agent having initiated a data collection and so on. As another example, the other data may include information retrieved from a stored object that is related to collected data. To illustrate, data collected via a component may include data detected by a sensor that is receiving biological signals from a given person, and the other data may include characteristics pertaining to the person.

Each data element in a stream may be assigned an index. Indices may be used to monitor whether and/or an extent to which data elements are being reliably transmitted. The indices may correspond to an order in which data elements are appended to the stream. Thus, monitoring a stream-transmission reliability may then include detecting whether data elements corresponding to each of a set of sequential indices have been received.

Stream processing system 120 can be configured to receive, transform, route and/or store data elements from each of one or more streams. Stream processing system 120 can include, for example, a transaction management engine (e.g., transaction management engine 106) and/or transformative processing engine (e.g., transformative processing engine 108).

Stream processing system 120 may, in some instances, be remote from one, more or all sources of data streams being processed. Stream processing system 120 may include a server farm that may include a collection of specialized stream processing engines (e.g., each engine being a server or processing core). A stream processing engine may be specialized so as to include, for example, fast multi-lean memory buses (e.g., a 128-bit or 256-bit wide interconnections). A stream processing engine may be configured for bulk memory transfers. For example, a Stream Register File (SRF) can store stream data to be transferred to external data stores in bulks and specialized chips (e.g., the Imagine chip) can facilitate strategic flow and packing of the SRFs.

Various processors and/or layers within stream processing system 120 can be specialized to perform various types of tasks. For example, a first set of processors may be configured to transform data within the stream in real-time (e.g., to produce data in a standard format and/or one that corresponds to a report protocol) and detect (e.g., based on data included in a header of a data element) whether the transformed data includes one or more particular composites (e.g., or fields). The first set of processors may thus be configured to perform on-chip processes with low latencies.

Upon detection of such one or more particular composites within a data element, a first processor may transmit the data element (or a replicated version thereof) to one or more second processors, which may be configured to perform more specialized extraction, apply a processing of a rule (e.g., of a report protocol), request and/or retrieve data from a remote data source, and/or store data associated with the data element (e.g., in a L1, L2, or L3 Cache, a local RAM or a remote data store).

A report protocol can include one defined, at least in part, based on one or more communications received from a protocol generator device 124. Such a report protocol may be identified at the protocol generator device 124, e.g., based on input received at the device from a user (e.g., authorized to generate a rule that applies for one or more general conditions). A report protocol can include one or more general conditions of applications, such as ones that specify for which time periods, facilities, locations and/or data sources for which the protocol is to apply. A report protocol can also include a flag definition that may specify what types of data indicate that information corresponding to a data element is to be reported. For example, a flag definition may include an identification of each of one or more composites and/or one or more values associated with each of the one or more composites. The one or more values may include, for example, a numeric, textual or categorical value. The one or more values may include a threshold and/or define a bound for a closed or open range. Thus, for example, a corresponding value included in a data element may be determined to be consistent with the one or more values if it is within a range (or outside the range—depending on how the protocol is defined) or exceeds the threshold in a particular direction (e.g., is above or is below the threshold). As another example, a corresponding value included in a data element may be determined to be consistent with the one or more values if it is the same as one (or all) of the one or more values.

One or more third processors may be configured to securely communicate with one or more event monitor devices 126 (e.g., which may be associated with a particular facility and/or an agency having authority over a given facility or population). Such communications may include, for example, receiving and/or responding to a request for one or more report communications and/or transmitting one or more report communications. Event monitor devices 126 to which reports are transmitted may include devices identified via a report protocol (e.g., such that a report protocol includes an identification of a particular event monitor device; an identification of a facility or agency associated with an event monitor device; or an identification of a webpage or website associated with the particular event monitor device). A report can include, for example, data from and/or identifications of data elements flagged during a report-protocol performance (or processed version thereof); an identification of one or more data sources; a count (e.g., of flagged data elements) and/or an index or storage address associated with each of one or more of the flagged data elements. The report may include data in a format corresponding to that required or otherwise associated with a corresponding event monitor. Thus, in some instances, the one or more third processors may transform the data (e.g., from a standard format to an event-monitor format). A report communication can be transmitted to an event monitor 125, e.g., via file upload (e.g., SFTP, SSH, FTP), web interaction, email, etc., and the type of communication may include one specified in a corresponding report protocol.

It will be appreciated that, in various instances, one or more of the depicted devices may be co-located. As mere illustrations, a protocol generator device 124 may be located in a same geographic area (e.g., building, city, zip code, district or state) as one or more data-collection devices (e.g., component 102 or user device 104).

Some or all of the data in streams being processed by stream processing system 120 may be routed to one or more data store management systems 130, which can store the data at one or more non-volatile memory stores and/or respond to requests (e.g., from an event monitor device 126) to retrieve specific data. For example, data store management system 130 may maintain a data structure that relates one or more indices to a storage location or address. An index may uniquely relate to, for example, a data element, composite, subject, source, facility and so on. Thus, it will be appreciated that, in some instances, a storage address can correspond to a plurality of indices, and—depending on a type of an index—a plurality or storage addresses may be associated with a single index. Data store management system 130 may be located in a same or different geographic area than stream processing system 120, an event monitor 126 and/or one or more data-collection devices.

Figure 2:
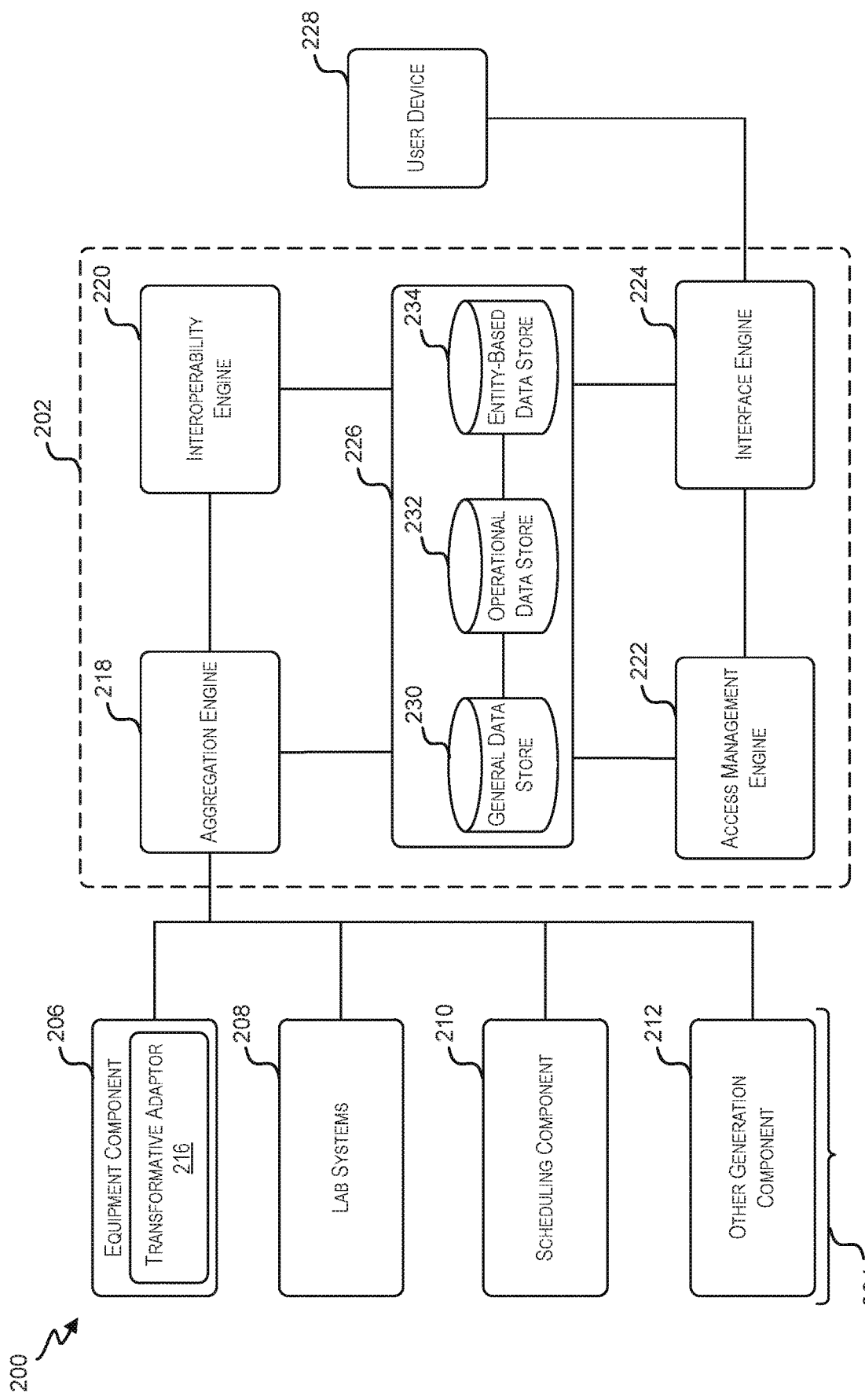
FIG. 2 shows a block diagram of an example of an interaction system.

Referring next to FIG. 2, a block diagram of an example of an interaction system 200 is shown. Interaction system 200 includes a transformative integration engine 202. Transformative integration engine 202 is an example of transformative processing engine 108 discussed with reference to FIG. 1. Interaction system 200 also includes one or more generation components 204. In particular, one or more generation components 204 includes an equipment component 206, a lab systems component 208, a scheduling component 210 and other generation component 212. One or more generation components 204 are examples of one or more components 102 discussed with reference to FIG. 1.

Generally, one or more generation components 204 includes any suitable device or system capable of generating data in the context of an interaction system. For example, the other generation component 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

As discussed in further detail herein, data generated by one or more generation components 204 can be of a variety of formats, some of which may be proprietary. For example, a single component can generate data in multiple formats, different components can generate data in different formats, and/or different component types can result in generation of data in different formats. In some instances, formatting of a data can depend on a service having been provided, a user initiating data generation, a destination to receive the data, a location at which a service was provided, etc. In some examples, a typical interaction system includes thousands of generation components producing data in hundreds of formats. In order to harness the power that comes from such a large amount of data to make informed decisions, it is desirable that all, or at least a large portion of the data, is shared. Use of transformative integration engine 202 in accordance with techniques described herein may achieve this design—making large amounts of data, in many different originating formats available to various types of users, via one or more interfaces.

While one or more generation components 204 are illustrated adjacent to each other, it is understood that each may be located within one facility or that the components may be spread out among many facilities. In addition, in some examples, one or more generation components 204 belong to different clients.

Turning now to equipment component 206, this component includes any machine, contrivance, implant, or other similar related article, that is intended to aid in reaching a particular objective. In some instances, equipment component 206 includes one or more sensors to detect environmental or other stimuli. Equipment component 206 can include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 includes transformative adaptor 216. In some examples, transformative adaptor 216 is a device that transforms, translates, converts, or otherwise adjusts output data from equipment component 206. For example, an equipment component 206 can be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-define or learned. Transformative integration engine 202 may perform similar tasks as it relates to all data generated within interaction system 200. In this manner, transformative adaptor 216 can perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. In some examples, equipment component 206 may not include transformative adaptor 216.

Lab systems component 208 includes any suitable laboratory equipment or system that is intended to analyze material, such as biological material. This includes, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative integration engine 202.

Scheduling component 210 includes any suitable computing devices used for business-related purposes with respect to interaction system 200. For example, scheduling component 210 can be configured to schedule a resource for allocation for a particular entity during a particular time slot. Scheduling component 210 can monitor a schedule for the resource and can identify one or more available time slots that may be secured by a particular entity. Upon receiving a scheduling indication, scheduling component 210 may update a schedule of a resource to reflect that a particular time slot is to be allocated for service of a particular entity.

Each of one or more generation components 204 and the user device 228 may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and can include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors can be implemented as one or more integrated circuits, e.g., one or more single-core or multi-core microprocessors or microcontrollers, examples of which are known in the art. In operation, the one or more processors can control the operation of the particular component. The one or more processors may access and execute the program code and at any given time.

The user interface can include any combination of input and output devices. In some instances, a user can operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative integration engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative integration engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative integration engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

Transformative integration engine 202 includes an aggregation engine 218, an interoperability engine 220, an access management engine 222, an interface engine 224, and a data store 226. Generally aggregation engine 218 is configured to collect data from multiple communications. The data may be from one or multiple generation components 204 and/or may be of a same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 can identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 can be configured to provide data from one or more communications to interoperability engine 220. Interoperability engine 220 can be configured to perform one or more operations on the received data and store it in data store 226. For example, interoperability engine 220 may perform semantic tagging and indexing of data. This may include extracting field values from data, categorizing data (e.g., by type of data, characteristic of an entity, location of facility, characteristic of facility, and the like), anonymizing or partially-anonymizing data, and the like. Interoperability engine 220 may also include a high availability cache, an alerts engine and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which can include devices of different entities and/or a cloud server). In some examples, data store 226 includes a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, business and analytics information, output data from one or more generation components 204, and the like may be retained. The data within the data stores 230, 232, and 234 include elements or tags such that a particular data (e.g., for a single entity, protocol, etc.) can be retrieved.

Access management engine 222 is configured to manage access to features of transformative integration engine 202, including access to the data retained in data store 226. For example, access management engine 222 may verify that a user device such as user device 228 is authorized to access data store 226. To verify the user device 228, access management engine 222 may require that a user of the user device 228 input a username and password, have a profile associated with the interaction system, have paid a subscription fee associated with access to data store 226, and the like. Access management engine 222 may also verify that the user device 228 has an IP address or geographical location that corresponds to an authorized list, that the user device 228 includes a plug-in for properly accessing data store 226, that the user device 228 is running certain applications required to access data store 226, and the like.

Interface engine 224 is configured to retrieve the data from data store 226 and provide one or more interfaces for interacting with elements of transformative integration engine 202. For example, interface engine 224 includes an interface by which an application running on user device 228 can access portions of data within data store 226.

Figure 3:
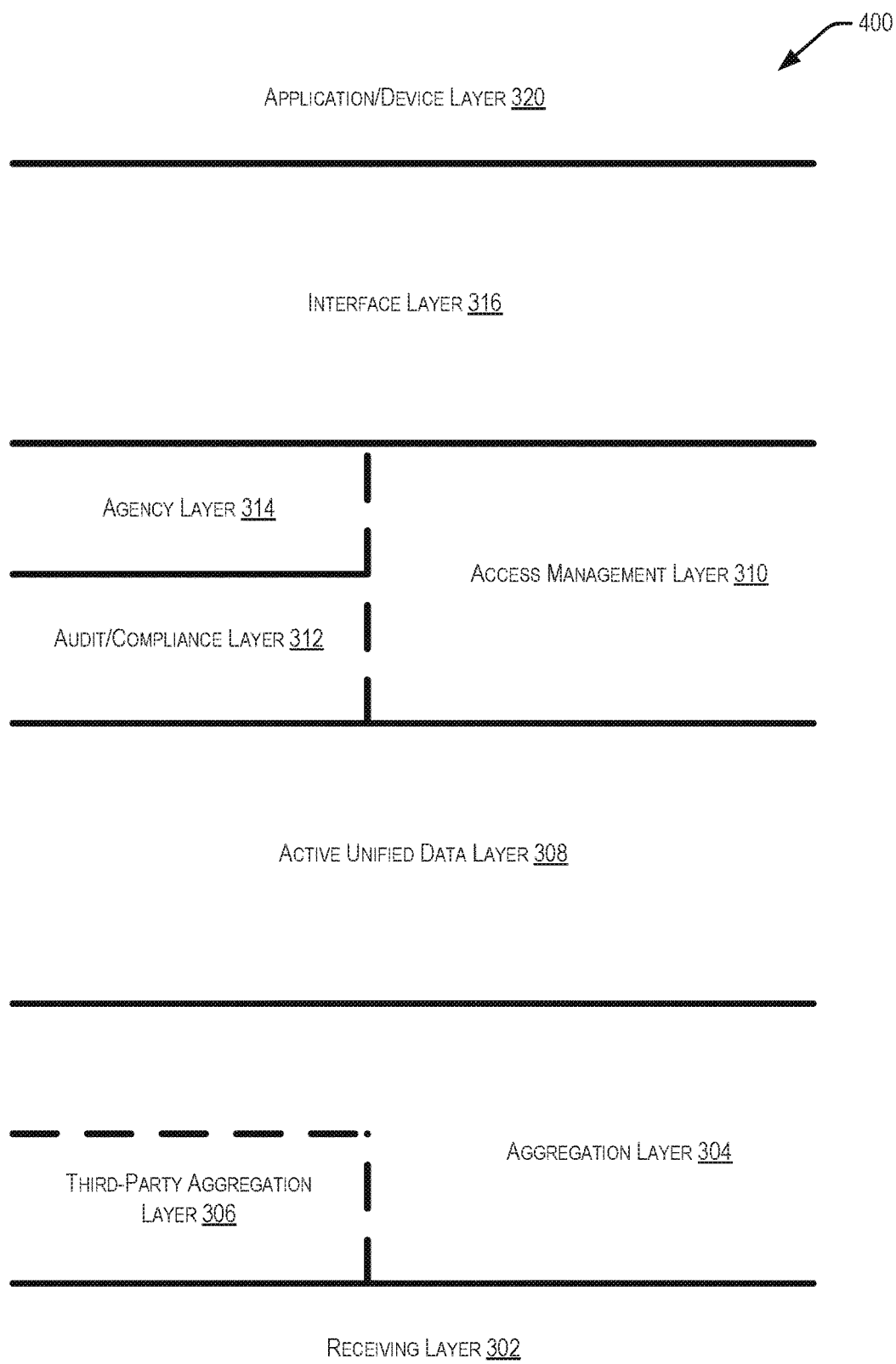
FIG. 3 shows an architecture stack according to an embodiment of the invention.

Turning next to FIG. 3, an architecture stack 300 is shown. In some examples, techniques relating management of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 can be used to integrate different systems of different organizations, entities, and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 includes a receiving layer 302 as the bottom-most layer. Receiving layer 302 includes receiving data from elements that share data with other elements within an aggregation layer 304. For example, as detailed herein, receiving layer 302 can include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a schedule, or in any other suitable manner. In some examples, data of aggregation layer 304 may be aggregated according to input and/or rules and may aggregate across records pertaining to, e.g., a facility, entity, time period, characteristic (e.g., demographic characteristic or condition), outcome, and any other suitable input and/or rules. The aggregation may include compiling the data, generating a distribution, generating a statistic pertaining to the data (e.g., average, median, extremum or variance), converting the data, transforming the data to different formats, and the like.

Next, architecture stack 300 includes an active unified data layer 308. Elements of active unified data layer 308 receive data from the elements of the other layers and store such data in a unified manner. In some examples, this may include storing the data in a manner that allows for later searching and retrieval using a defined set of method calls, techniques, and or procedures. For example, the data may be stored such that a different application can access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also includes an access management layer 310, which can include an audit/compliance layer 312 and/or an agency layer 314. Access management layer 310 includes elements to manage access to the data. For example, access management layer 310 may include elements to verify user login credentials, IP addresses associated with a user device, and the like prior to granting the user access to data stored within active unified data layer 308.

Audit/compliance layer 312 includes elements to audit other elements of architecture stack 300 and ensure compliance with operating procedures. For example, this may include tracking and monitoring the other elements of access management layer 310.

Agency layer 314 includes an access location (e.g., a virtual private network, a data feed, or the like) for elements of agencies that are interested in the operations of the interaction system in which architecture stack 300 is implemented. For example, agency layer 314 may allow a governmental entity access to some elements within architecture stack 300. This may be achieved by providing the governmental entity a direct conduit (perhaps by a virtual private network) to the elements of access management layer 310 and the data within active unified data layer 308. Audit/compliance layer 312 and agency layer 314 are sub-layers of access management layer 310.

Architecture stack 300 also includes interface layer 316. Interface layer 316 provides interfaces for users to interact with the other elements of architecture stack 300. For example, clients, entities, administrators, and others belonging to the interaction system may utilize one or more user devices (interacting within application/device layer 320) to access the data stored within active unified data layer 308. In some examples, the users may be unrelated to the interaction system (e.g., ordinary users, research universities, for profit and non-profit research organizations, organizations, and the like) and may use applications (not shown) to access the elements within architecture stack 300 via one or more interfaces (e.g., to access data stored within active unified data layer 308). Such applications may have been developed by the interaction system or by third-parties Finally, architecture stack 300 includes application/device layer 320. Application/device layer 320 includes user devices and applications for interacting with the other elements of architecture stack 300 via the elements of interface layer 316. For example, the applications may be web-based applications, entity portals, mobile applications, widgets, and the like for accessing the data. These applications may run on one or more user devices. The user devices may be any suitable user device as detailed herein.

Figure 4:
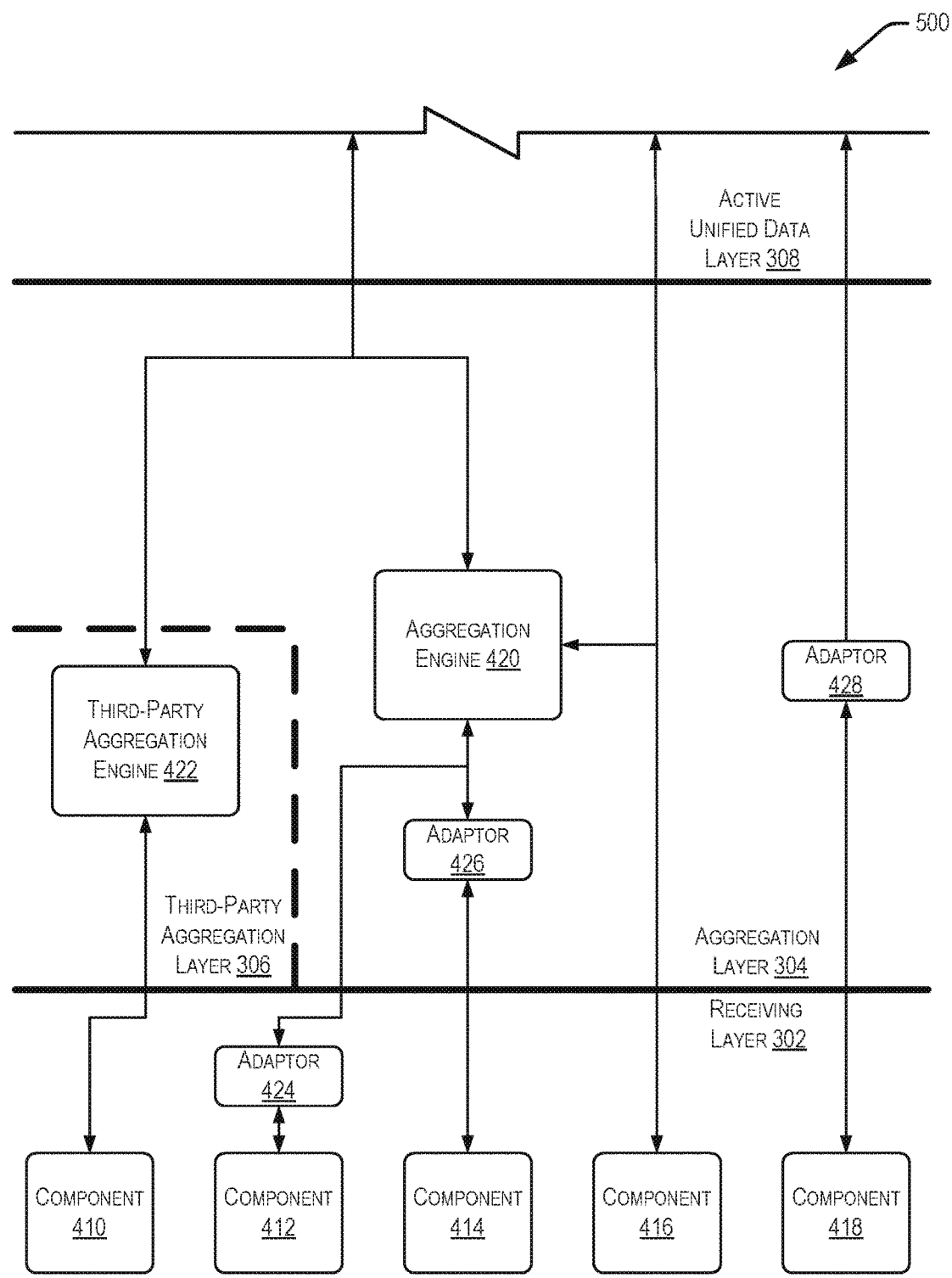
FIG. 4 shows a portion of an architecture stack according to an embodiment of the invention.

Turning next to FIG. 4, a diagram 400 is shown that depicts a portion of architecture stack 300 according to an embodiment of the invention. In particular, the diagram 400 includes receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple facilities within a single or multiple clients. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data can then be transformed, translated, or otherwise adjusted before an aggregation engine 420 (e.g., aggregation engine 218) or a third-party aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors can function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to third-party aggregation engine 422.

Aggregation engine 420 and third-party aggregation engine 422 function in a similar manner. In some examples, third-party aggregation engine 422 is operated by a different entity than the entity that operates aggregation engine 420 and may belong to different clients or a different interaction system. This may be because the data collected by third-party aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the third-party aggregation engine 422, and some of components 410-418 and elements of active unified data layer 308.

Figure 5:
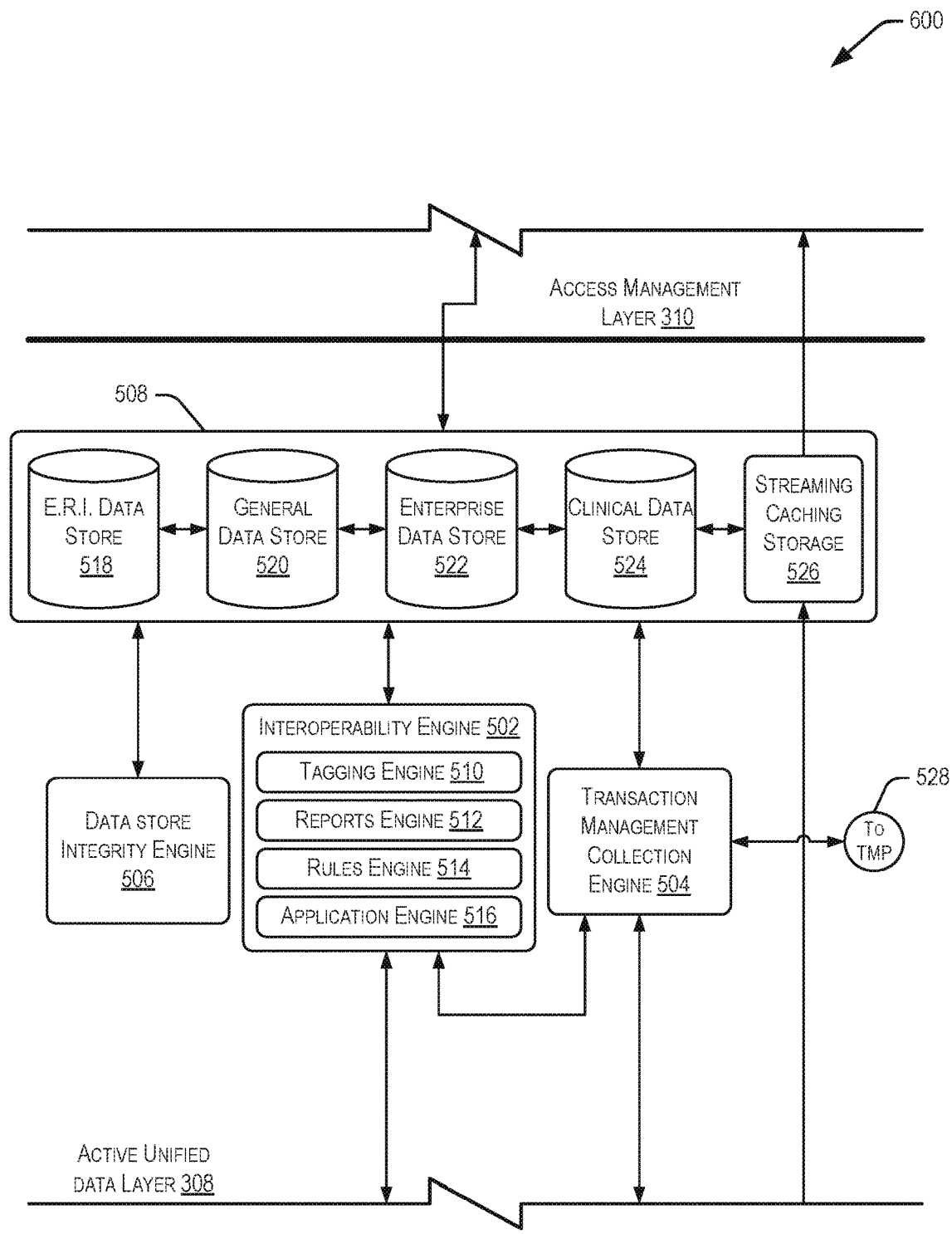
FIG. 5 shows a portion of an architecture stack according to an embodiment of the invention.

Referring next to FIG. 5, a diagram 500 is shown that depicts a portion of architecture stack 300 according to an embodiment of the invention. In particular, diagram 500 includes active unified data layer 308 and a portion of access management layer 310. Active unified data layer 308, as illustrated in diagram 500, includes an interoperability engine 502 (e.g., interoperability engine 220), a transaction management collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Transaction management collection engine 504 is implemented as part of transaction management engine 106. Transaction management collection engine 504 is configured to generate message indicators identifying flows of data by and between elements of an interaction system implemented using the techniques described herein. The flows of information include messages which include data, and the message indicators include unique message identifiers that can be used to identify the messages. The unique message identifiers include information that can be used to uniquely identify the messages. For example, a unique message identifier for a particular message can include a concatenation of the following information stored in a table: a source application, a facility, a message type, and a message control identification (ID). The unique message identifier can also be the message control ID. The unique message identifier may be created as messages including data are transmitted from aggregation layer 304. The table may be stored in association with the transaction management platform 528.

In some examples, the table also includes information for tracking the progress of the message from an origination node to a destination node. For example, typically when a message (e.g., any communication of data) is first received by transformative processing engine 108 (e.g., interoperability engine 502), transaction management engine 106 (e.g., transaction management collection engine 504 of transaction management engine 106) may generate a unique identifier for the message in order to track that message as it moves throughout the interaction system. The unique identifier may be included in the header of the message such that when the next node (e.g., component, device, server, etc.) after transformative processing engine 108 receives the message, that node can report back to transaction management engine 106 that it saw the message. In this manner, transaction management engine 106 may enable end-to-end tracking of messages for the life of the message.

In one example, the messages are requests. The requests may be generated based om user input at one of the components. The requests may be received by transformative processing engine 108 and integrated into the system. In some examples, transaction management engine 106 may be notified that the requests have been received and may therefore be configured to generate message IDs for each request. These message IDs may then be associated with each of the requests. As the requests continue to move throughout the interaction system (e.g., away from transformative processing engine 108), transaction management engine 106 may be track their movement using the message IDs. If one of the requests does not make it to its destination, transaction management engine 106 (or part of the transaction management platform 528) may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, transaction management engine 106 (e.g., transaction management collection engine 504 of transaction management engine 106) may receive the message and/or message identifier directly from one of components 410-418. For example, one of components 410-416 may be configured to generate the unique message identifier and/or communicate directly with transaction management engine 106. The message also may travel via one or more intermediate nodes on its way to the destination node. In some examples, a node is a component such as components 410-418, which may be running an application. In some examples, the unique identifier and the routing of the message to its destination may be stored in a table that also includes: a geolocation of each node, a network from which the message originated, a type of node, the unique node identifier, and a time associated with the message leaving the origination node. In some examples, transaction management collection engine 504 provides unique message identifiers to other elements of the interaction system to monitor the messages as they move throughout the interaction system. Transaction management collection engine 504 also provides a portion of the unique message identifiers to a transaction management platform (indicated by a circle 528) for further analysis of the message identifiers. Such analysis may include reconciliation of lost messages, latency reporting, audit management and compliance, and other such analyses.

As mentioned previously, interoperability engine 502 is configured to store data in data store 508. A plurality of sub-engines 510-516 of interoperability engine 502 are configured to perform operations relating to storing data in data store 508.

Interoperability engine 502 includes a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by outside third-party mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against (e.g., to identify that the author's name corresponds to Dr. Brown who is an oncologist). Other examples, of metadata that may be included in one or more fields include author, document type, creation time and date, last update time and date, upload time and data, geographic location, unique ID associated with the client or facility where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may involve filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words (e.g., tagging a record with "cancer" upon detecting words such as tumor, metastasize, chemotherapy, radiation, oncology, malignant, stage 3, etc.). In this manner, tagging engine 510 may also index portions of the data within one or more data stores of data store 508. In some examples, such indexing may be based in part on the selected tags.

Interoperability engine 502 also includes a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications can include, for example, signals, sirens, electronic notifications, popups, emails, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also includes a rules engine 514 configured to create and manage business rules, condition-response rules, alert/reports rules, data-formatting rules, data-sharing rules, transmission rules, aggregation rules, user authorization rules, law-based rules, and other similar rules. Such rules may be user-defined, fixed, learned by elements of the interaction system, and any combination of the foregoing. Finally, interoperability engine 502 includes an application engine 516 configured to provide service-oriented architecture web services.

Data store 508 includes an electronic record information data store 518 ("record data store 518"), a general data store 520, an operational data store 522, an entity-based data store 524, and a streaming caching storage 526. While data store 508 is illustrated as including a fixed number of data stores and storage elements, it is understood that data store 508 can include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data can then be formatted, filtered, sorted and/or processed and then stored, presented and/or otherwise used. In this manner, the script can be used to produce streaming analytics.

In some instances, the data query script, when executed, identifies each of the data stores of interest. Identifying the data stores of interest involves identifying at least a portion of data from the data stores simultaneously and/or sequentially. For example, the script can identify corresponding data stores (e.g., or components of a single data store or multiple data stores) that pertain to one or more similar variables but that differ in one or more other variables. Once the portion of the data from the data stores is identified, a representation of the identified data can be output to one or more files (e.g., Extensible Markup Language (XML) files) and/or in one or more formats. Such outputs can then be used to access the data within one or more relational database accessible using Structured Query Language (SQL). Queries made using SQL can be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within record data store 518 is retained data including electronic record information. In some examples, the information within record data store 518 is organized according to entity identifying information. Thus, record data store 518, in some examples, includes individually identifiable information. But it may also include de-identified information.

Within general data store 520 is retained data. The data may be stored in a relational database format or in any other suitable format. Thus, the data within general data store 520 may be retained in a data structure that includes one or more tables capable of accessing each other. In some examples, general data store 520 includes a subset of the information that is included in operational data store 522.

Within operational data store 522 is retained data in a relational database format. Thus, the data within operational data store 522 may be retained in a data structure that includes one or more data structures (e.g., tables) capable of accessing each other. Operational data store 522 is an example of an operational data warehouse. In operational data store 522 is joined many different types of data. For example, clinical, financial, and administrative information are stored in operational data store 522. In some examples, the operational data ware house 522 includes data pertaining to decision making as discussed herein and other data typically used by conventional business concerns.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, transactional, secure, database server with built-in search and a full suite of application services. An example of such a unified system may be Marklogic. Entity-based data store 524 can support data aggregation, data organization, data indexing, data tagging and mapping to semantic standards, concept matching, concept extraction, machine learning algorithms, concept discovery, concept mining, and transformation of personal record information. In some examples, entity-based data store 524 includes data pertaining to decision making (similar to general data store 520) as discussed that is organized and accessed in a different manner. For example, the data within entity-based data store 524 may be optimized for providing and receiving information over one or more information exchanges. In some examples, entity-based data store 524 includes a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data can be cached. For example, assume that component 418 is a piece of equipment operating at Location A and that a user using a computer in Location B desires to view a live of substantially live stream of outputs of the piece of equipment. Component 418 can send a portion of data to streaming caching storage 526 which can retain the portion of the data for a certain period of time (e.g., 1 day). Thus, streaming caching storage 526 is configured to cache data that can be streamed.

Diagram 500 also includes data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
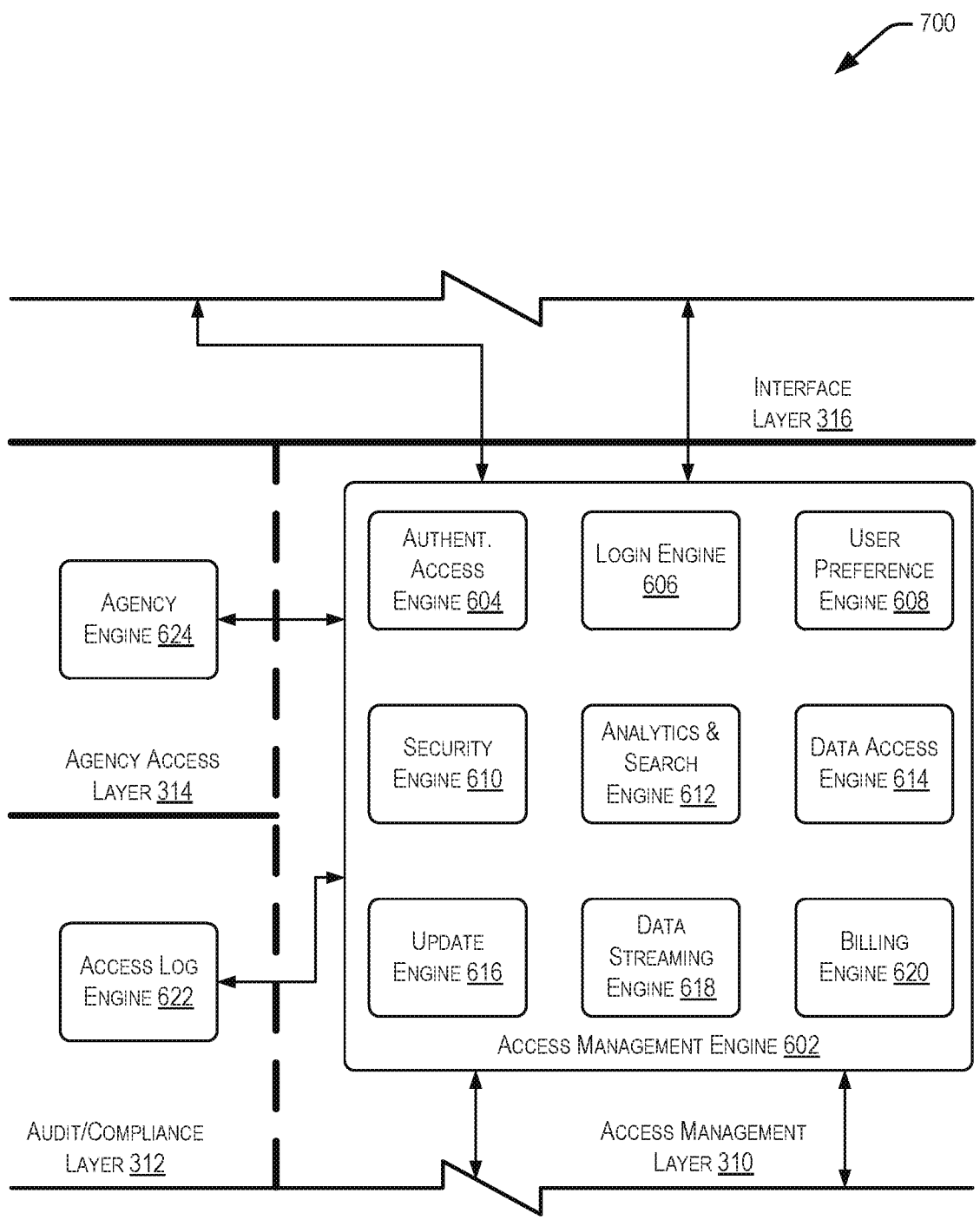
FIG. 6 shows a portion of an architecture stack according to an embodiment of the invention.

FIG. 6 shows a diagram 600 which depicts a portion of architecture stack 300 according to an embodiment of the invention. In particular, the diagram 600 includes access management layer 310, audit/compliance layer 312, agency layer 314, and a portion of interface layer 316.

Access management layer 310, as illustrated in the diagram 600, includes an access management engine 602. Access management engine 602 is an example of access management engine 222. Generally, access management engine 602 can be configured to manage access to elements of transformative integration engine 202 by different components, applications, and user devices.

Access management engine 602 within access management layer 310 also provides functionality similar to an operating system. For example, access management engine 602 includes a plurality of engines configured to manage different aspects of interacting with elements of the interaction system. For example, a user who desires to access portions of data retained in data store 508, may do so by interacting with access management engine 602 using one or more applications (not shown). Thus, access management engine 602 includes a variety of engines to enable such interaction. The engines include, for example, an authentication access engine 604, a login engine 606, a user preference engine 608, a security engine 610, an analytics and search engine 612, a data access engine 614, an update engine 616, a streaming data engine 618, and a billing engine 620. The different engines of access management engine 602 can define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 can confirm that an entered username (e.g., and password), provided biometric data or code or identifier in a scanned tag or badge matches that in an authorized user data structure.

Login engine 606 evaluates one or more user profiles associated with each authenticated user. In some examples, a user profile includes a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

Security engine 610 evaluates the rules and conditions for ensuring the security of access to the elements of the interaction system. In some examples, these rules and conditions are determined by administrators of the interaction system. In some examples, security engine 610 provides a plurality of computer virus protection services. These services can be called up and implemented when accessing the interaction system or accessing applications associated with the interaction system. The rules and conditions may be based on roles, based on profiles, based on domains, and any other suitable security configuration. For example, because the interaction system may include sensitive data, security engine 610 may enforce a domain-based rule that protects certain sensitive information (e.g., identifying information).

Analytics and search engine 612 evaluates the rules and conditions under which users can search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 can be used to search within various fields and potential field values. In some examples, search engine 612 can provide analytics, such as statistics, graphs, distributions and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may manage which users can access parts of the interaction system, data access engine 614 may manage how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access management engine 602) may be provided to developers in the form of a software development kit (SDK). SDKs may enable developers write applications that can effectively communicate with elements (e.g., data store 508) of the interaction system. In particular, applications that can access a portion of the data stored within active unified data layer 308.

Update engine 616 evaluates the rules and conditions for providing updates to other engines within access management engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access includes, in some examples, logging data conventionally collected by access log engines running in similar environments. Access log engine 622 can use this data to generate and transmit reports, for example, to stakeholders of the interaction system such that they can make informed decisions regarding that is accessing the interaction system and for what purposes.

Within agency layer 314 is located an agency engine 624. Agency engine 624 evaluates the rules and conditions under which agencies can access the interaction system. For example, agencies that may use agency engine 624 include agencies to which the interaction system provides compliance, tracking, or other reporting information. For example, agency engine 624 may be used to track one or more performance indicators identified by a government agency and/or to provide report instances of defined types of events. Thus, in some examples, a government agency uses agency engine 624 to collect data pertaining to compliance of the interaction system with one or more statutes or regulations. In some examples, a university is an agency that uses agency engine 624 to collect data pertaining to one or more studies. In some examples, agency engine 624 can identify one or more entities (e.g., governmental agencies) that are to receive reports pertaining to operations or events and what types of data are to be reported to those entities. Agency engine 624 can then collect the pertinent data, potentially format and/or analyze the data, and facilitate transmission of (e.g., raw, formatted and/or analysis of) the data to the appropriate agency.

Figure 7:
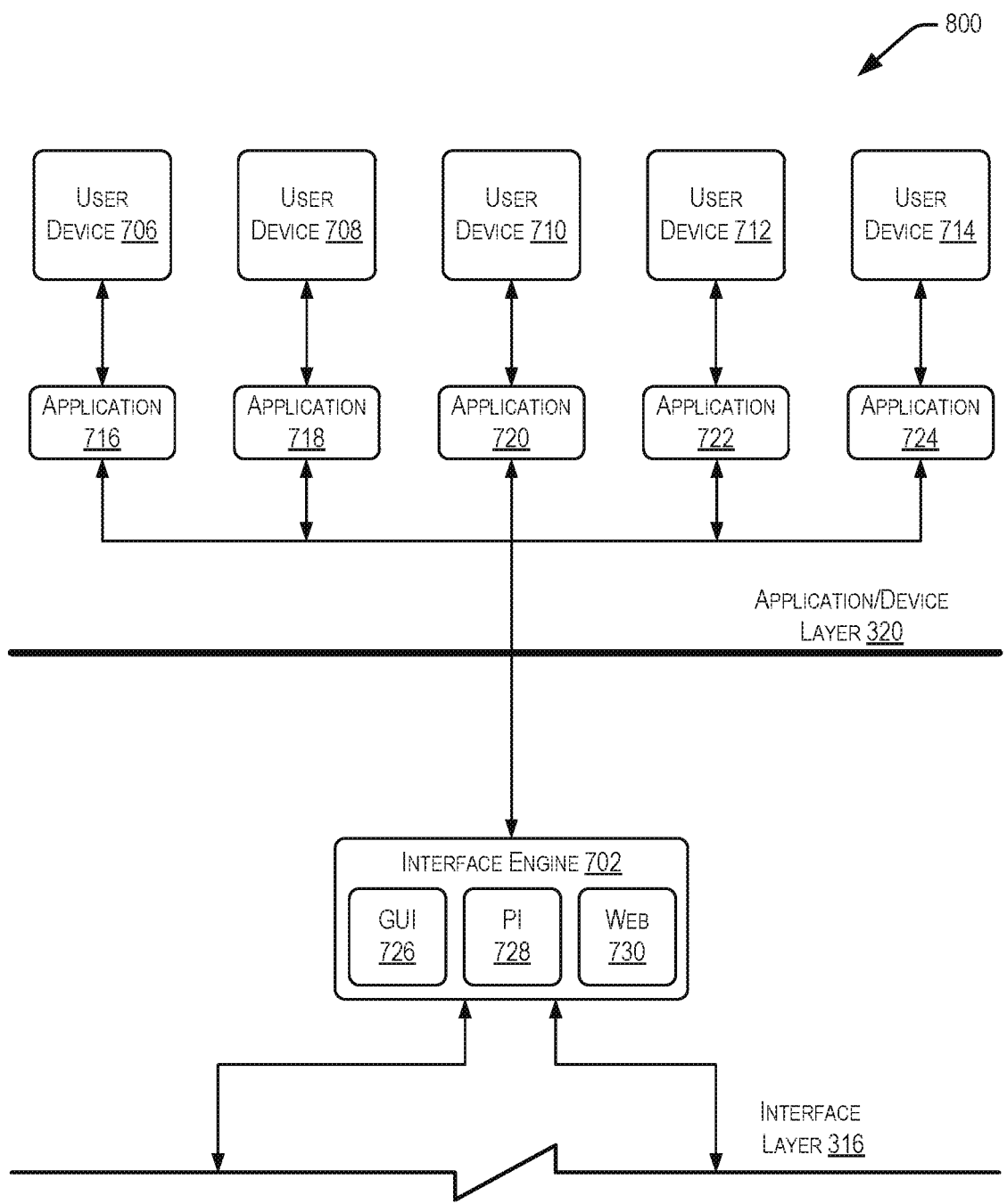
FIG. 7 shows a portion of an architecture stack according to an embodiment of the invention.

FIG. 7 shows a diagram 700 which depicts a portion of architecture stack 300 according to an embodiment of the invention. In particular, diagram 700 includes interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access management layer 310 may be embodied.

Graphical user interface 726 is any suitable graphical user interface configured to interact with elements of the interaction system. Programmatic interface 728 includes an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive user input, present dynamic presentations that depend on user input, and otherwise respond to user input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This includes detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 716-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that can be designed for particular users and/or uses. In one example, application 720 includes dashboards, widgets, windows, icons, and the like that are customized for an particular entity. In some examples, application 720 may present different data depending on a specialty associated with the entity and protected information associated with the entity. In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or actions, and the like. Application 720 may be configured to receive input, adjust presentations, present unpromopted alerts, adjust display of content, move more relevant content to the foreground, move less relevant content to the background, populate forms for the entity.

In another example, application 722 may be specific for nurses or types of nurses. In this example, application 722 may include dashboards, widgets, windows, icons, and the like that are customized to individual nurses. Similar to the example discussed above pertaining to the doctor, in some examples, application 724 may present different data depending on a position of the nurse. In this manner, application 722 adapts and automatically adjusts depending on the context in which the nurse is using the application. For example, the nurse may receive data, such as test results.

In some examples, application 724 may be a multi-role application for administrators and is used to manage entities constitute the population of the entities or organizations within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 can provide different data depending on the role of the user. For example, whether data presented includes identifiable or de-identified information may depend on a position of the user.

In some examples, application 724 may be a business intelligence application. In this example, application 724 is used to display business information generated by components of the interaction system. This business information can be used for operations, planning, and forecasting. Such business information may include data because such data may impact operations, planning, forecasting, and the like. Accordingly, application 724 may present de-identified information in the form of one or more metrics, indicators, or the like as they pertain to business intelligence.

Applications 716 and 718 shown in connection with interface engine 702 are applications developed by third-parties. In some examples, such applications include any suitable application that benefits from accessing data. For example, the application 716 may be a health application, a nutrition application, a fitness application, and other similar applications. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
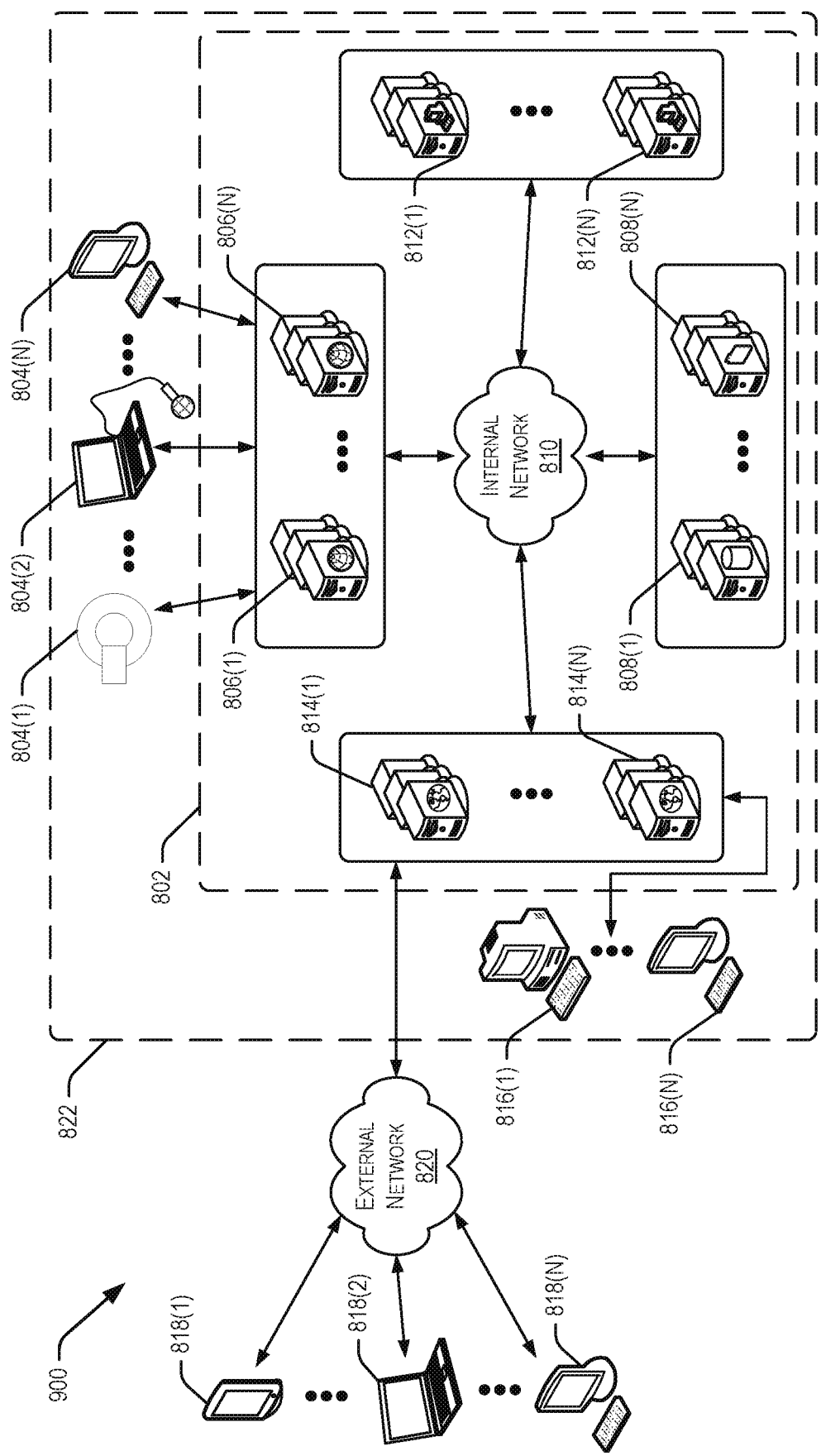
FIG. 8 shows an interaction system in accordance with an embodiment of the invention.

Turning now to FIG. 8, an interaction system 800 is shown in accordance with an embodiment of the invention. Interaction system 800 includes an internal organization 822 including a transformative integration engine 802. The transformative integration engine 802 is an example of transformative integration engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal organization 822 includes generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access management servers 812(1)-812(N) manage access to the data retained in the data storage servers 808(1)-808(N). Access management servers 812(1)-812(N) communicate with the other elements of interaction system 800 via internal network 810 and in accordance with access management layer 310.

Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) can be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) can run applications developed by third parties that access the other elements of interaction system 800 via the interfaces generated by interface servers 814(1)-814(N).

External user devices 818(1), 818(2), and 818(N) access the interfaces via external network 820. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

Figure 9:
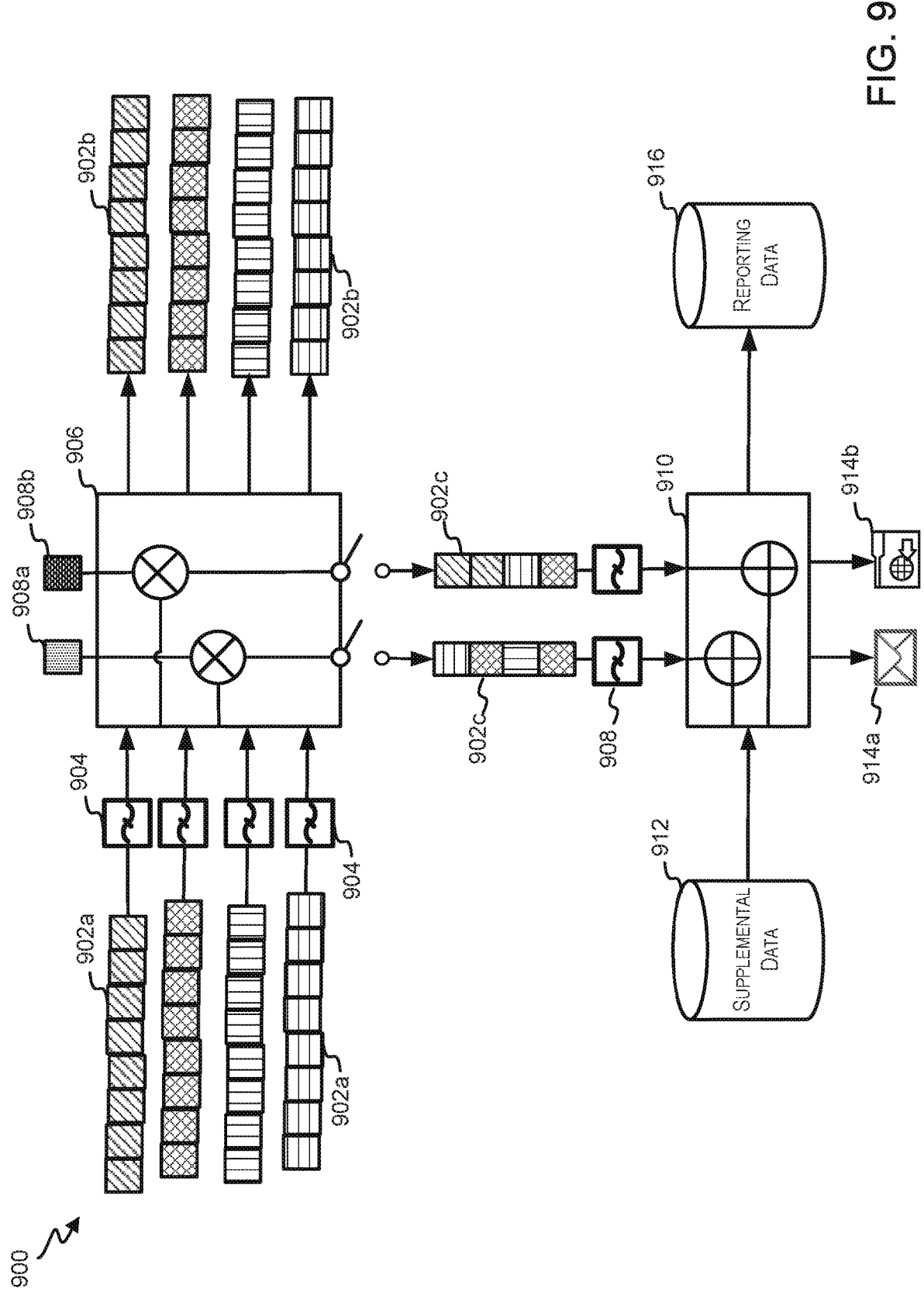
FIG. 9 shows an illustration of a data flow according to an embodiment of the invention.

FIG. 9 shows an illustration of a processing flow 900 according to an embodiment of the invention. Processing flow 900 may be performed at one or more devices or systems, such as at stream processing system 120, which may include a plurality of servers.

A plurality of data streams 902a are received (e.g., over a network, such as a local area network, a WiFi network, or the Internet) from each of a plurality of sources (e.g., from a single facility or multiple facilities), such as a component or user device that collects at least some of the data included in each data element based on inputs detected at the device or measurements made by a sensor of the device. Each stream includes a plurality of individual data elements, which may correspond to data collected with respect to a same time period, subject, test, assessment, etc. and/or data included in a same record or record update. Data elements may be separated, for example, within a stream via a particular (or one of multiple particular) characters or strings or data elements may begin or end with a particular (or one of multiple particular) characters or strings. Such dividing, beginning or ending characters or strings may facilitate extracting individual data elements from a string.

Data elements within a stream may be sequentially received. In some instances, data elements from a given stream are received in a continuous or near continuous manner, such that stream data is being continuously received over a given input time period, e.g., over a static (e.g., wireless) and secure connection channel. In some manners, data elements in a stream are sent via discrete transmissions and may be separated by intervals of communication silence.

Data received from different sources and included in different streams may differ in terms of, for example, data standards, document structures, identified composites, types of data, and so on. In some instances, such differences may be present across data elements even in a single stream and/or from a single source. For example, various data elements (from a single source or from different sources and/or in a single stream or in different streams) may differ with regard to whether data within the data element complies with the X12N, ASTM, HL2 or HCPDP (or other) standards.

In some instances, one or more filters 904 are applied to the incoming the data. A filtering technique (or one or more filters) may be consistent with respect to all streams, or a filtering technique (or even whether any filtering technique is to be used) may differ across streams. A filter 904 may operate, for example, to attenuate, blur or remove particular features of a data stream. For example, such features may include data or values associated with particular composites. Blurring a feature may include, for example, assigning a numeric composite value to a numeric bin, scrambling letters, assigning a numeric composite value to a functional category, and so on. As another example, a filter may be constructed to selectively permit particular features to pass. Filters may be defined, for example, based on filter-defining communications received from a device associated with a given source, according to a rule and/or based on what data is required to perform an applicable report protocol. It will be appreciated that the filtering may occur at a device associated with a data source (e.g., and transmitting the stream), at a processing node configured to determine whether particular protocol-specified elements exist in data elements, or at another device.

A multiplier 906 can be configured to determine whether each element includes a data pattern that is consistent with one or more defined report protocols 908a, 908b. A report protocol may define a data pattern as one that includes, for example, one or more particular composites and, in some instances, for at least one of the particular composites, one or more values (e.g., a particular value, a threshold for which values are to be above or below, a range, or a list of values) that is to be associated with the composite. It will be appreciated that a data pattern need not include a particular, or any order. Thus, for each data stream, multiplier 906 can identify one or more applicable protocols (e.g., based on source identity, stream metadata, a current time, a stream identifier, etc.). Then, for each data element in the data stream, multiplier 906 can determine whether each of the components of the protocol-specified data pattern is present in the data element.

In some instances, multiplier 906 operates via interception of a stream, such that—upon completion of processing to determine whether particular data patterns are present—analyzed data elements are output from multiplier 906 via one or more output streams 902b. Output streams 902b may, for example, proceed to a data store management system to be stored in non-volatile memory and/or evaluated so as to assess a reliability of stream transmission and/or processing.

Data elements for which multiplier 906 determines include protocol-specified data patterns can be flagged and output via a reporting output 902c. In various instances, a single report output 902c can include data elements from a single source or from multiple sources. A report output 902c may include a stream or other data configuration.

Elements in each of one or more reporting outputs 902c may (in some instances) be filtered using each of one or more filters 908. A filter 908 may operate, for example, to attenuate, blur or remove particular features in elements of the reporting outputs. For example, such features may include data or values associated with particular composites. Blurring a feature may include, for example, assigning a numeric composite value to a numeric bin, scrambling letters, assigning a numeric composite value to a functional category, and so on. As another example, a filter may be constructed to selectively permit particular features to pass. Filters may be defined, for example, based on filter-defining communications received from a device associated with a given source, according to a rule and/or based on what data is required to perform an applicable report protocol. A type or extent of filtering may be consistently applied or may depend on factors such as, for example, an original source of a data element, a value (e.g., identifying a location, time stamp or institution) of a composite in a data element, a destination, a current time, and so on. In one instance, at least some of the filtered data includes data evaluated to determine whether particular data patterns were present in the data.

An adder 910 can collect supplemental data to transmit in combination with data in some or all of the reporting outputs 902c. The supplemental data can include, for example, data associated with a source of a data element (e.g., a name and/or location), template data, and/or data related to values in the (e.g., filtered or unfiltered) data elements.

In some instances, particular supplemental data may be added to a collection of (filtered or unfiltered) data elements in a reporting element. For example, the supplemental data may be added in a header in an electronic file. In some instances, supplemental data may be combined with each of one or more individual (filtered or unfiltered) data elements (e.g., as metadata). In some instances, supplemental data is interjected into part of a stream.

The combined data may be transmitted to one or more destinations. An address of a destination (e.g., an IP address)

may be specified within a rule and/or report protocol. Filtered and/or unfiltered, supplemented and/or unsupplemented data elements can be transmitted to a destination via a discrete and/or continuous transmission. Exemplary types of transmission include, for example, transmission via messages 914a (e.g., email messages, SMTP, or faxes), or file transfer 914b (e.g., via FTP, SSH or other file transfer protocol). A transmission may include one to a single or to multiple defined destinations and/or, in some instances, a broadcast transmission.

A transmission may occur, for example, repeatedly, continuously and/or upon detecting a particular event. An event may include, for example, a particular time, passage of a particular time period since a last transmission, detecting one (or a threshold number) of data elements ready for transmission, and/or receiving a request for the data.

Adder 910 may also send reporting details to a reporting data store 916. Reporting details may include, for example, a time of transmission, a destination identifier, and/or an identifier or a data element (and/or data-element data, such as a composite and/or composite value) represented in the transmission. In one instance, a reporting detail sufficiently identifies each data element represented in a transmission so as to enable retrieval of the original data element (e.g., one as included in stream 902a or 902b) from a local or remote data store.

Figure 10:
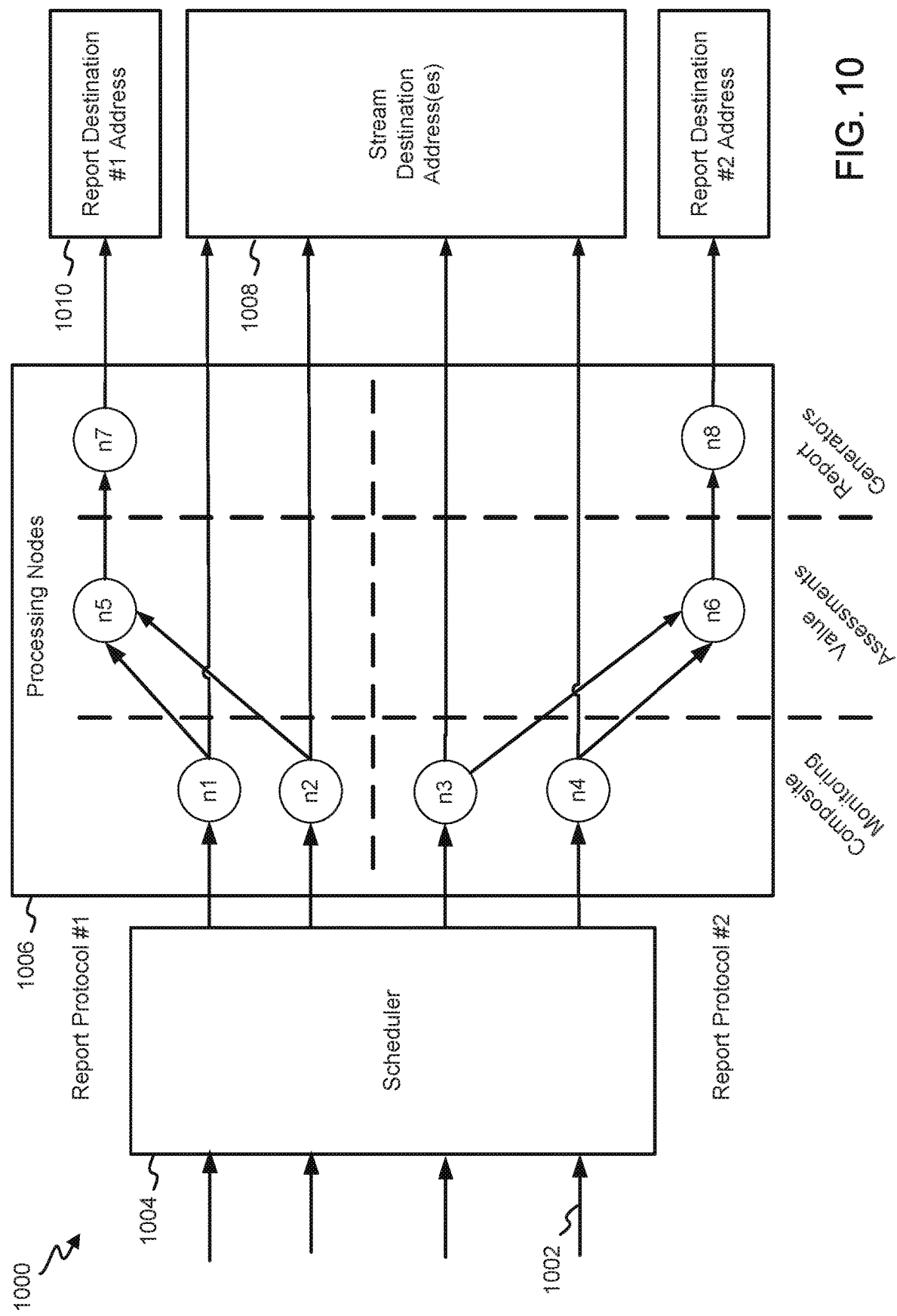
FIG. 10 shows an illustration of a processing flow across processing nodes according to an embodiment of the invention.

FIG. 10 shows an illustration of a data flow 1000 across processing nodes according to an embodiment of the invention. As depicted, a plurality of data streams 1002 are received at a scheduler 1004, which may be a component (e.g., including one or more dedicated servers and/or processors, such as stream processors) of stream processing system 120. Scheduler 1004 can assign each data streams or individual data elements in each data streams to a processing node from amongst a set of processing nodes 1006, which may be a component (e.g., including one or more dedicated servers and/or processors, such as stream processors) of stream processing system 120. In some instances, each processor node in set of processing nodes 1006 includes an independent processor and/or network address relative to other nodes in the set. Some or all of the nodes in the set may be co-located or physically distributed.

Set of nodes 1006 may include a first node layer that performs initial processing of data elements. In the depicted instance, nodes n1-n4 are in the first layer. Scheduler 1004 may identify a node to which to assign a data element or stream based on, for example, a current or past memory or processor usage of each of one or more nodes; a processing latency of each of one or more nodes; a backlog of each of one or more nodes; and/or a dedication of each of one or more nodes (e.g., to one or more data sources, data types and/or report protocols). For example, in the depicted instance, nodes n1-n2 are dedicated to Report Protocol #1 and nodes n3-n4 are dedicated to Report Protocol #2.

Each of one, more or all nodes in set of nodes 1006 may be configured to perform one or more particular processing tasks. For example, nodes n1-n4 may be configured to assess data in each data element to detect when a data element includes a specified composite. Such processing may be performed, for example, based on pattern recognition, computing data checksums (e.g., using a defined pattern), generating data products, performing if statements or searches, performing logic operations, and so on. Different nodes may be configured to monitor for different data. For example, nodes n1 and n2 may be configured to detect when a data element includes a set of composite identifiers and values that correspond to those specified in Report Protocol #1 and nodes n3 and n4 may be configured to detect when a data element includes a set of composite identifiers and values that correspond to those specified in Report Protocol #2.

In some instances, irrespective of whether the particular data is detected, first-level nodes may route data streams to one or more destination addresses 1008. It will be appreciated that data elements in a single stream and/or in multiple streams may be routed to a same destination address or to different destination addresses. Destination addresses 1008 may correspond to, for example, devices, systems and/or data stores that are physically separate from set of nodes 1006 and/or scheduler 1004 and/or that are co-located with set of nodes 1006 and/or scheduler 1004. Destination addresses 1008 can include, in some instances, an address identified in a streaming rule applicable to a particular data stream and/or data element. In some instances, data elements and/or a stream is routed to multiple destination addresses. A stream destination may maintain an index so as to be able to associate a storage location with one or more data-related identifiers, such as an identifier of a data, data source and/or time stamp.

In some instances, data is processed by first-level nodes or by other nodes prior to routing the data to the destination addresses. The processing may include, for example, applying a filter. Processing may further be performed as part of a monitoring and detection action. For example, all or part (e.g., composite identifiers) may be transformed from one standard or format to another (e.g., to a base standard, such as an HL7 standard, or a standard that corresponds to a rule or protocol).

When a first-level node detects a presence of particular data in a data element, the node may send pertinent data (e.g., data element or replicate thereof or extracted data) to a second-layer node (e.g., node n5 or n6). A second-level node may process the data to determine whether a value associated with each of one or more particular composites corresponds to a specified value. For example, the determination may include detecting the associated value and determining whether the value matches any of one or more specified values or exceeds one or more specified threshold (e.g., is above a lower threshold and/or is below an upper threshold). Such processing may be performed, for example, based on pattern recognition, computing data checksums (e.g., using a defined pattern), generating data products, performing if statements or searches, performing logic operations (e.g., comparing a composite value to each of one or more thresholds), and so on.

When a second-level node detects a presence of particular data in a data element, the node may send pertinent data (e.g., data element, extracted data or an identifier of a data element) to a third-layer node (e.g., node n7 or n8). The third-level node may collect data to include in a report. The data may include data within a data element, an identifier of a data element, supplemental data associated with a data element (e.g., linked to a composite value or identifier included in the element) and/or metadata associated with a data element. The data may include an identifier of a data source and/or data stream. A report may include data pertaining to a single data element and/or to a set of data elements. A report may include an electronic file, an electronic message, a segment of a stream or other collection of electronic data.

The third-level node may organize, process and/or filter collected data so as to conform with a transport protocol, type of transmission and/or configuration of a destination device. For example, a report may be generated using a schema associated with a destination device. A third-level node may further transform data from one standard (e.g., a base standard) to another (e.g., one associated with a destination).

The report may include data that pertains to and/or was included within a single data stream 1002, multiple data streams, a single data element and/or multiple data elements. For example, a third-level node can aggregate data as it pertains to multiple data elements for which particular data (e.g., particular composites and composite values) were detected until a reporting event is detected. The reporting event may include, for example, a particular time or receipt of a request for a report. The aggregated data can then be transmitted within, for example, a file, a communication and/or stream component to a destination. As another example, upon receiving data from a second-level node indicating that the particular composites and/or composite values have been detected within a data element, a third-level node can generate a report for that data element. A report may be, for example, instantly transmitted or stored and transmitted with other reports in batch mode (e.g., upon detecting an event). A report may be transmitted, e.g., over a wireless connection to a report destination device 1010. The report may be transmitted according to a transport protocol, such as a streaming protocol or TCP.

Thus, data flow 1000 provides an indication of how a multi-layer distributed processing system may be used to process data (e.g., streaming data) in real-time. A layered node organization can facilitate minimally disrupting a stream (e.g., with regard to transmission latency and/or order disruption) and utilizing parallel processing to quickly detect and report select data. The framework is also scalable, as nodes can be added to a set when additional data streams are incoming and/or when a density of data elements per stream increases.

Figure 11:
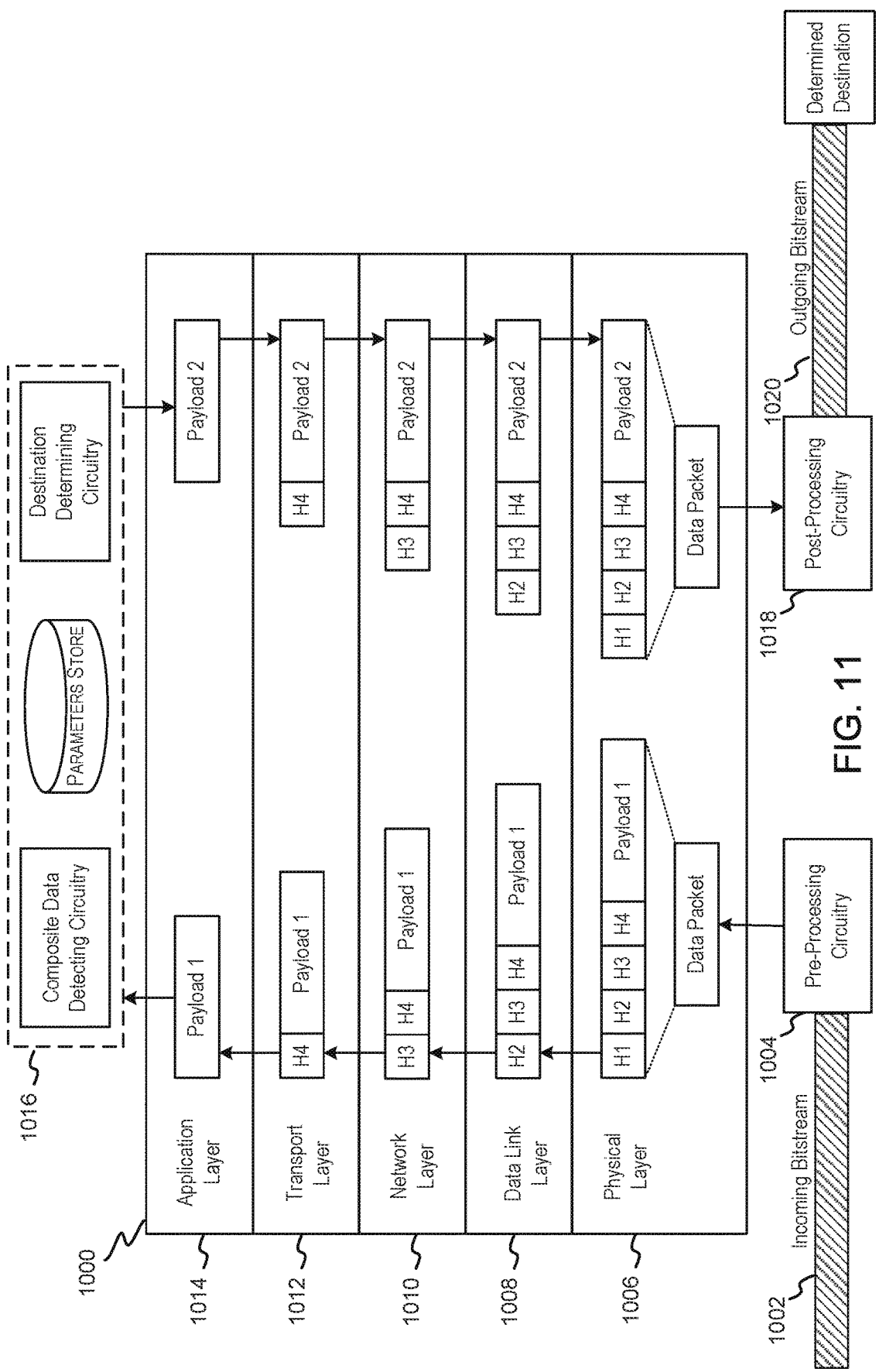
FIG. 11 shows an illustration of a protocol stack configured to facilitate stream processing according to an embodiment of the invention.

FIG. 11 shows an illustration of a protocol stack 1100 configured to facilitate stream processing according to an embodiment of the invention. Protocol stack 1100 can include one operating on a device or system described herein, such as a processing node, set of processing nodes, stream processing system, scheduler, and/or data store management system.

An incoming bitstream 1002 can include, for example, data from a stream or discrete communication. Bitstream 1002 feeds into pre-processing circuitry 1004, which perform processing on some or all of the bitstream data. Such processing can include, for example, filtering, converting, encoding, decoding, standardizing or other processing of the data and may generate data packets with a data frame structure. The data packet can include a set of headers and a payload.

These data packets are received at a physical layer 1006 of protocol stack 1000, which reads the header H1 and determines that the payload (along with other headers in the packet) goes up a layer to a data link layer 1008. Data link layer 1008 reads the next header and determines that the payload (and other headers) is to proceed to a network layer 1010. In a similar manner, the data packet is routed to a transport layer 1012 and finally an application layer 1014.

Physical layer 1006 can be configured to transform raw bits into data packets and the converse. The raw bits can include those transmitted over physical links via electrical, mechanical or magnetic signals. Data link layer 1008 can be configured to transform data packets into frames and the converse. Data link layer 1008 can facilitate transmission and/or receipt of data between nodes in a network (e.g., using MAC addresses) and may use protocols such as Ethernet, or the Point-to-Point Protocol.

Network layer 1010 can transform logical network addresses into physical machine addresses (e.g., MAC addresses) and/or the converse and facilitate transfer of data (e.g., via one or more routers) between nodes in a network. Network layer 1010 can use protocols such as IP protocols (e.g., IPV4, IPV6, IPSEC or IPX) and can transform data packets into segments and the converse.

Transport layer 1012 can transform data payloads into segments and the converse. This layer may use protocols such as TCP, UDP, SPX, DDCP or RSVP. An RSVP protocol, which may be used to reserve resources across a network may be well-suited for handling data streams (e.g., original data streams, report streams, etc.) involved in techniques described herein.

Application layer may generate or process data payloads. The application layer may use protocols such as FTP, HTTP DHCP, DNS, or Telnet protocol. Though not shown, protocol stack may also include a presentation layer and/or a session layer. The presentation layer which may transform data from an application-specific format to one used by an operating system (e.g., ASCII or an image format. The session layer may establish, manage and/or terminate sessions between an instant device and another device (e.g., to facilitate a stream transmission).

As shown in FIG. 11, application layer 1014 can communicate with and/or include circuitry 1016 configured to detect and analyze payload data, such as identifiers of composites or composite values. Circuitry 1016 may be configured to perform one or more actions and/or include one or more components as described herein. For example, circuitry 1016 can include composite data detection circuitry (e.g., to detect whether the payload includes particular composites and whether the composites values are within particular ranges or match particular values), parameters store (which can store the user-defined parameters, including the particular ranges, etc.), and destination determining circuitry (which can automatically identify a destination based on the composite and/or value detections or which can determine the destination based on some user input/parameter).

Using circuitry 1016, application layer 1014 can generate a second payload corresponding to that from incoming bitstream 1002. The second payload may include some or all of the data from payloads from the incoming bitstream 1002 and/or other data (e.g., identifying a source, detection result, time, and so on). The second payload may be of a same or different format of one from incoming bitstream 1002. It will be appreciated that—depending on the embodiment—application layer 1014 may selectively or unconditionally generate a corresponding payload for each received payload. For instance, a corresponding second payload may be generated only when circuitry 1016 detects particular composites and composite values as defined in a report protocol.

Layers 1012, 1110, 1008 and 1006 may then sequentially append headers and/or transform the second payload. Post-processing circuitry 1018 can convert second-payload data packets into a bitstream (e.g., this conversion can include encoding or compressing the data to optimize the bandwidth), which is transmitted to the determined destination.

Figure 12:
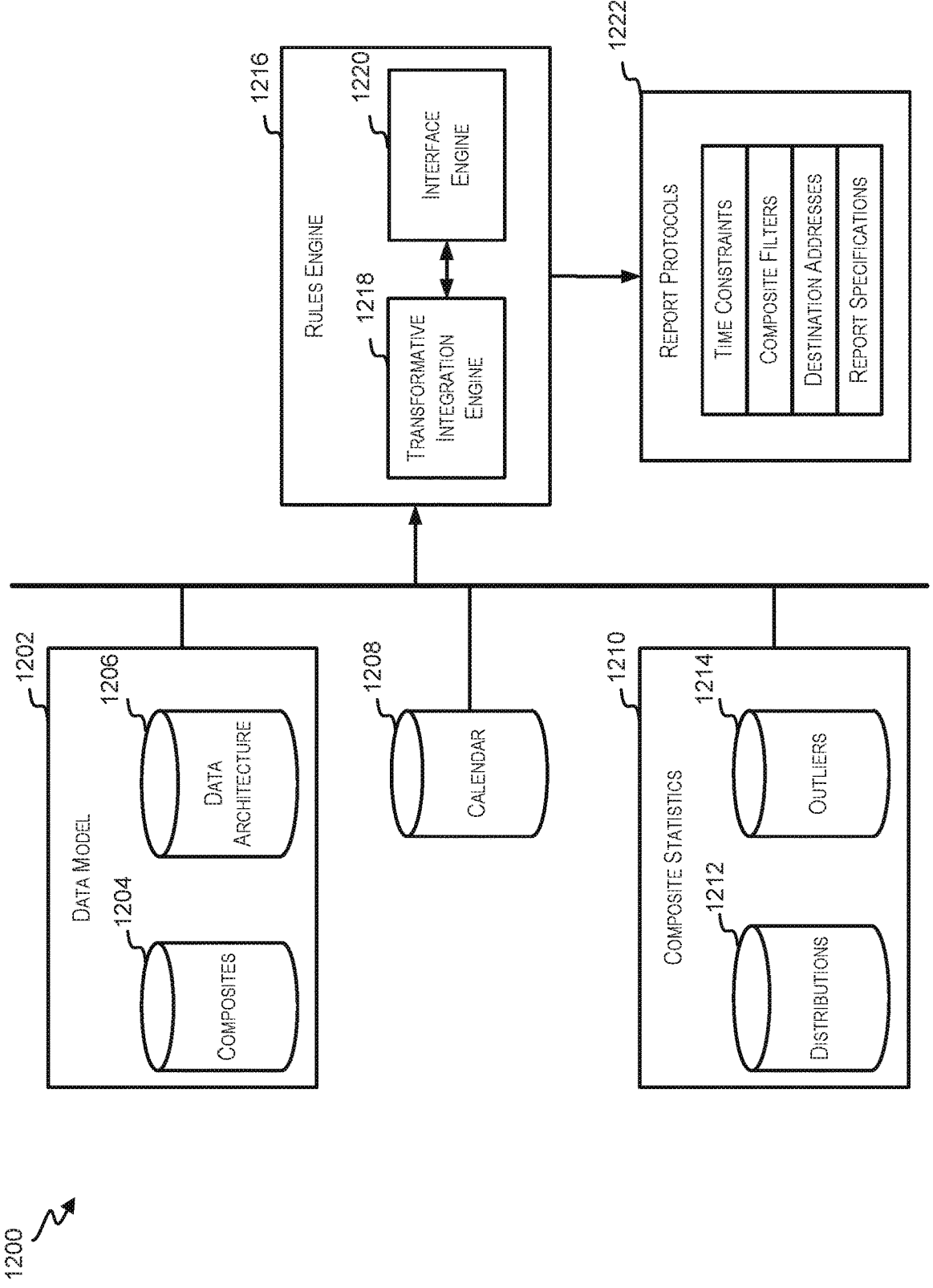
FIG. 12 shows an illustration of a protocol generation system according to an embodiment of the invention.

FIG. 12 shows an illustration of a protocol generation system 1200 according to an embodiment of the invention. Protocol generation system 1200 includes a data model 1202 that defines an organization, structure and/or representation of data features and relates various data features to each other.

Data model 1202 can, include, for example, a conceptual data model (e.g., a subject area model or high-level data model) that draws upon a conceptual schema. A conceptual model may include entity classes (e.g., data sources and/or composites) and relations between entity classes. Data model 1202 can also include a logical data model can represent relationships and entity classes and may use a standardized format, such that the model can be used across platforms and database management systems. Data model 1202 can further include a physical data model, which may include specifications of data storage, such as those relating to partitions and CPUs. It will be appreciated that data model 1202 may additionally or alternatively include other types of data models, such as a hierarchical model, network model, relational model or object-relational model.

Data model 1202 can specify entity classes or composites 1204 of significance. Each composite 1204 may be represented, for example, by one or more identifiers (e.g., in various formats or standards). Each of one or all composites may be configured to correspond—in data elements—to a value that is indicative of a specification of the composite.

Data model 1202 can include a data architecture 1206, which can identify one or more structures and/or organizations for data-provision in a data element, data input, data stream, etc. For example, data architecture 1206 may specify relative locations of composite values compared to composite identifiers, breaks between data elements, header structure, and so on.

Data model 1202 may be specified by input or may be learned via a machine-learning technique. For example, the technique may identify general structures of composite identifiers (e.g., one or more characters having a character length within a range). Upon detecting such a structure with character identities not matching any defined composite, the technique may generate a new composite or may monitor to determine whether a threshold number of occurrences of the character(s) are detected. In some instances, a clustering or neural-network technique can be used to determine whether two different composite representations are to be merged as representing the same type of data.

Protocol generation system 1200 further includes a calendar 1208. Calendar 1208 may relate each of one, more or all dates to a day of the week, whether the date is a holiday, whether the date is a date associated with reporting significance (e.g., an end of a fiscal year), and soon. Calendar 1208 may correspond to stored data, may be determined based upon an algorithm or may be based on received communications including calendar data.

Protocol generation system 1200 also includes composite statistics 1210, which may be based on, for example, composites and composite values detected in data elements. Composite statistics 2010 can include distributions 121, outliers 1214 and/or other statistics (e.g., mean or median values, probability of detection, etc.). A distribution may indicate, for example, a distribution of values of a given composite across a set of data elements. The set of data elements may include, for example, all data elements received at a given system (e.g., stream processing system) or device, data elements from a given source, data elements including an identifier of a particular composite (e.g., corresponding to the value), data elements received within a defined recent time period and so on. For example, for a composite that pertains to a concentration of a particular substance or type of cell, a distribution may include a count (or probability) of data elements having values for the composite that were within each of 20 (or other number) defined ranges.

Distributions or other types of analysis (e.g., based on standard-deviation analysis or a predictive approach) may be used to detect outliers 1214 for each of one or more composites. Distributions 1212 and/or outliers 1214 may be used to automatically generate a threshold or other relationship for a composite. The threshold or relationship may be defined so as to determine whether a given value for a composite is itself an outlier, is within a tail of a distribution, etc. The threshold or relationship may be generated merely based on the values or may be based on a multivariate data set that includes paired composite values and outcome values (e.g., which itself may be represented by a composite in a same or related data element).

Representations of data model 1202, calendar 1208 and/or composite statistics 1210 can be availed to a rules engine 1216, which can be configured to generate or modify a report protocol 1222. Rules engine 1216 can include a transformative integration engine 1218 to transform data into a standard associated with a particular user or presentation device. An interface engine 1220 can present data such as various composites; corresponding distributions, outliers and/or learned thresholds or relationships; and a calendar. Interface engine 1220 can detect inputs that correspond to selection and/or specification of (for example) one or more composites; one or more open or closed date ranges; a value constraint (e.g., identifying one or more particular values or an open or closed range); and/or one or destination identifiers (e.g., device addresses or entity names). Transformative integration engine 1218 may transform such inputs into a base or other form or standard.

Using these inputs, rules engine 1216 can develop one or more report protocols 1222. A report protocol may include a time constraint that indicates a date range during which the protocol is to apply. The date range may pertain to a time of processing or a date included within data elements being processed. A report protocol can also include a composite filter, which may specify one or more composites and a value constraint for each of the composites. Such specifications may indicate that data from a given data element is to represented in a report output when the data element (or corresponding data) includes the specified composites and values consistent with the corresponding constraints.

A report protocol can further include one or more destination addresses, such as an IP address, MAC address, email address, web address (e.g., upload address), FTP address and so on. A report protocol may further include a report specification, which may indicate what type of data (e.g., composite-detection indication, particular composite values or processed versions thereof, data-source information, time and so on). Thus, in general, a report protocol may specify when a report protocol is to be implemented, a reporting condition, what to include in a report and where to send a report. It will be appreciated that a report protocol may include additional indications, such as composite-value constraints for applying the protocol (e.g., which may be identified based on input and/or association of a given user having provided an input), a type of transmission to send a report, and so on. By defining and using one or more report protocols, data systems can be improved to reliably detect and report key data.

Figure 13:
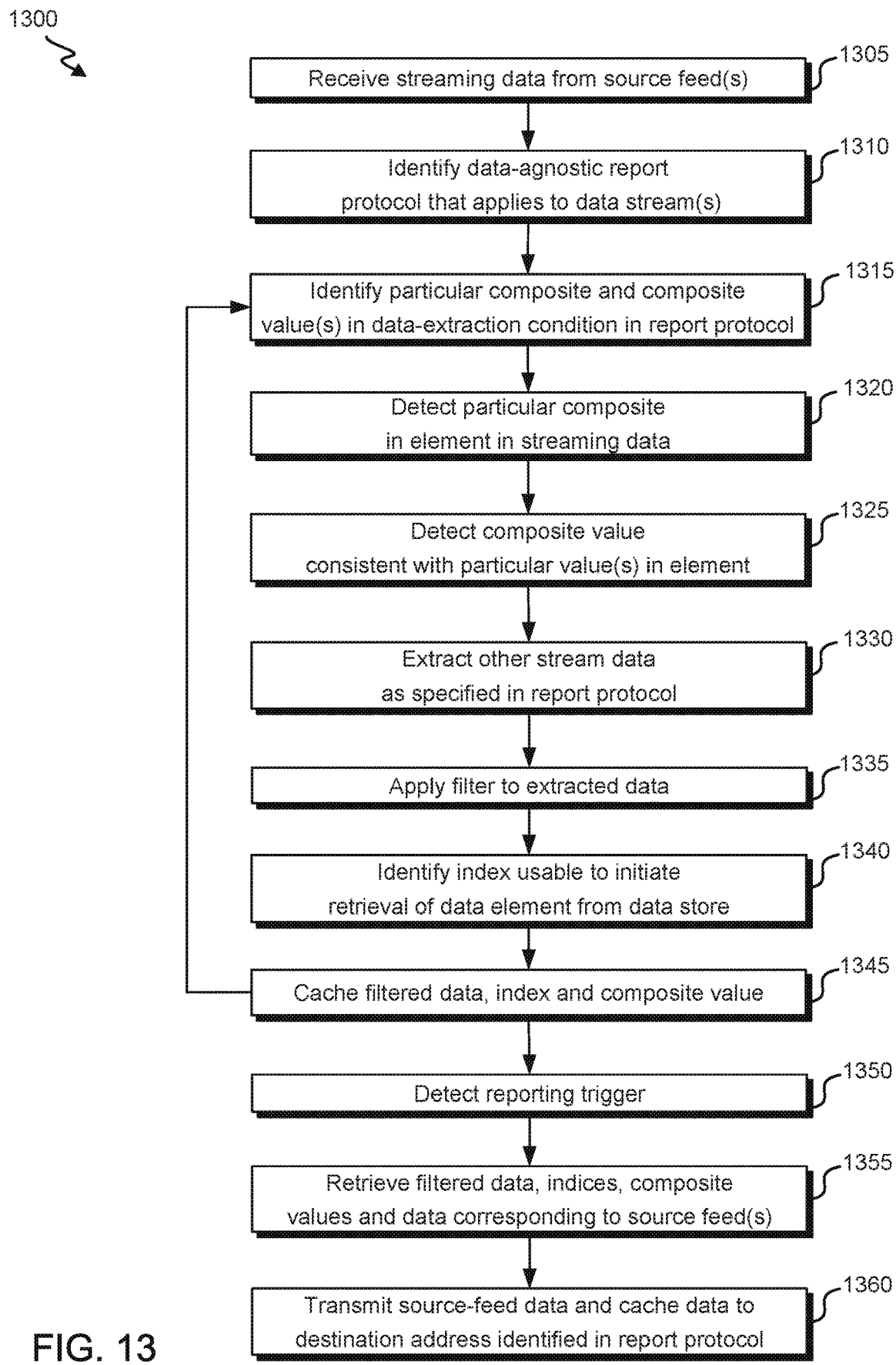
FIG. 13 shows a flowchart of a process for processing data streams according to an embodiment of the invention.

FIG. 13 shows a flowchart of a process 1300 for processing data streams according to an embodiment of the invention. Part or all of process 1300 may be performed, for example, at stream processing system 120, data store management system 130, and/or one or more processing nodes (e.g., of set of nodes 1006). It will be appreciated that performance of process 1300 may be distributed. For example, various nodes (e.g., co-located nodes or geographically dispersed nodes) may perform different actions in process 1300.

At block 1305, streaming data is received from each of one or more data sources. Each data source may correspond to, for example, a different institution, device, or piece of equipment. The streaming data may include a continuous data stream and/or intermittent data transmissions sent over an established connection.

At block 1310, a data-agnostic report protocol is identified that applies to the one or more data streams. The report protocol may include one with an applicability condition (e.g., identifying one or more data sources, geographic regions, composite values, metadata values and/or time periods) that is satisfied with respect to each of the one or more data streams. It will be appreciated that, in some instances, whether a report protocol is applicable can be determined on a stream- or source-specific instance. In some instances, an applicability depends on data within individual data elements in a stream (e.g., such that a report protocol may apply to some but not all data elements in a stream).

The report protocol may be data agnostic, such that conditions (e.g., data-extraction conditions) may be evaluated and/or report parameters may be determined irrespective of a structure type (e.g., unstructured, semi-structured or having one of a plurality of structures), formats, standards or protocols corresponding to a data stream. In some instances, such general applicability may be available so long as incoming data complies with an industry standard. Such extended applicability may be facilitated via transformation engines (e.g., transformative integration engines), definitions of schemas, standards or format, and/or data-model structures.

The report protocol can include one or more conditions that indicate when one or more actions are to be taken. For example, a condition may indicate when data is to be extracted and/or a report is to be generated. In some instances, a condition relates to data included in a data element. For example, a condition may indicate that data is to be extracted from a particular data element for reporting when the element includes one or more composite values consistent with a criterion. Thus, at block 1315, a particular composite and/or one or more corresponding composite values is identified from a data-extraction condition in the data-agnostic report protocol. The particular composite may be identified so as, for example, to indicate which corresponding value(s) are to be evaluated. The one or more corresponding composite values may include a particular value (e.g., "Positive"), a list of particular values, a threshold or one or more range bounds. The one or more corresponding composite values may include, for example, a text string, number, or category.

At block 1320, the particular composite is detected within a data element included in the streaming data. In some instances, each data element is monitored for inclusion of the particular composite (e.g., via a search for a particular bitstream, string, etc.). Block 1320 may include, for example, transforming a composite identifier from a report standard or format to one that corresponds to a data stream or transforming data from the data stream into the report standard or format.

At block 1325, a composite value consistent with the one or more corresponding composite values is detected within the data element. Block 1325 may include identifying a value that corresponds to the particular composite. The value (or a transformed version thereof) can be assessed to determine (for example) whether it matches a composite value identified at block 1315, whether it exceeds a threshold composite value identified at block 1315 and/or whether it is within a range defined based on a composite value identified at block 1315. The detection may involve transforming the identified report-protocol composite value or a data-element composite value so as to change a format, standard or units of the value to allow for comparison between the report-protocol composite value and data-element composite value.

The detections at block 1320 and 1325 can indicate (alone or in combination with other detections) that the data-extraction condition is satisfied. In response to detecting satisfaction of the data-extraction condition, at block 1330, other stream data is extracted as specified in the report protocol. The other stream data may include other composite values. It will be appreciated that data may also be collected from external sources and/or other data. For example, electronic records may be indexed by and/or include identifiers corresponding to particular composite values. Data from one or more records can then be retrieved using a composite value.

At block 1335, a filter is applied to the extracted data. The filter may serve to reduce the precision of the extracted data. For example, if the extracted data includes a particular location (e.g., an address), the filter may be applied to generate a broader region (e.g., county) in which the location is located. The filter can include one defined based on the report protocol and/or based on report specifications associated with a destination identified in the report protocol. For example, a filtering rule may be defined so as to reduce data precision to a level matching that required or specified in a destination-associated report specification. It will be appreciated that a same or different filter may be applied to data collected from other collected data.

At block 1340, an index is identified that is usable to initiate retrieval of the data element from a data store. The index can include any value, composite identifier, storage address or data-element identifier that is usable so as to retrieve a particular data element or corresponding data from a local or remote data store. For example, a data stream received at block 1305 may include one intercepted during transmission from a source to a data store management system or data store. The index may include a value that can be used to retrieve the data element from the data store or data store management system. As another example, a data stream received at block 1305 may include on generated based on stored data, and the index may represent or include a storage location at which the data element was already stored. As yet another example, data elements for which a data-extraction condition or report condition was satisfied may be selectively stored, and the index may represent or include a storage location which the data element has been or will be stored. In some instances, identifying the index includes assigning an index to the data element, which can be associated with a storage location in a storage data structure. In some, identifying the index includes detecting an identifier or value that is uniquely tied to the data element, which can be associated with a storage location in a storage data structure. A storage location may include, for example, an identifier of a system, device, network, drive and/or path.

At block 1345, the filtered extracted data, index and composite value are cached. Process 1300 then returns to block 1315, such that other data elements can be monitored for inclusion of data consistent with the data-extraction condition. Actions of blocks 1315-1345 can be repeated until a reporting trigger is detected at block 1350. The reporting trigger may include, for example, passage of a defined time period or time, receipt of a request for report data, or accumulating of a threshold quantity of cache data (e.g., corresponding a defined number of data elements). The reporting trigger can include one specified in the report protocol.

At block 1355, the filtered data, indices and composite values are retrieved from the cache. Further, data corresponding to a source of one or more data streams (e.g., associated with data elements represented in the cached data) are also retrieved. The data corresponding to the source may include, for example, a name, identifier, location, institution type, device identifier, and/or type of device. Retrieval of data corresponding to the source may include retrieving data from a local or remote data structure (e.g., using an identifier of a data stream or source). In some instances, retrieval includes transmitting a request for data to a remote device.

In some instances, cached data and/or data included in particular data elements is insufficient to generate a report with data corresponding to all fields, to supply all data identified in the report protocol and/or to provide all data specified in a destination-associated report specification. In these instances, an incomplete report may be generated and transmitted or additional data requests be transmitted and/or element-related data may be retrieved to identify the missing data. For example, a message may be sent to a user device associated with an institution corresponding to a data element, which may be configured to be presented at a user interface (e.g., via an email or message) requesting the specified data. As another example, an electronic record or past data element (e.g., received in a same or different data stream) that is associated with a same identifier as one pertaining to cached data can be identified. Other data can then be extracted from a request-responsive communication or identified record. It will be appreciated that the relational and time-separated data identification may provide data that may not precisely correspond to the data in a data element represented in a report (e.g., due to time separation), though it may be sufficiently linked for reporting contexts. The report protocol may indicate whether (for example) request communications are to be transmitted and/or corresponding data is to be retrieved in response to detecting missing data or if a report output is to be generated without the data.

At block 1360, the source-feed data and data retrieved from the cached data are transmitted to a destination address identified in the report protocol. The data may be transmitted, for example, via a discrete communication (e.g., message or file upload) or via a data stream. The transmission may, in some instances, include an electronic with a webpage (e.g., to upload the file) or establishing a device connection (e.g., an FTP connection) and/or providing authorization credentials (e.g., associated with a data source or stream processing system). The transmission may be performed over a network, such as a wireless network (e.g., the Internet).

A log can be generated or updated to reflect the report. For example, the log can identify a time of the transmission, the destination address (or other destination identifier), an identifier of each represented data element, an identifier of represented data, an identifier of a data source and so on.

It will be appreciated that, in some instances, the data can be transmitted to multiple destinations. In some instances, data sent to different destinations may be sent at the same time, use a same schema, format or standard, include the same information, and/or include the same precision. In some instances, data sent to different destinations may be sent at different times, use a different schema, format or standard, include different information, and/or include different data precision. Such differences may be indicated in different report protocols and/or destination-associated report specifications.

The protocol-based processing described herein facilitates reliable and expedient detection of particular data patterns and reporting thereof. Distributed architecture further reduces disruption of mainstream data flows during a detection analysis. Transformation engines and data-agnostic protocols facilitate diverse application of detection criteria and improve a reach of protocol application. Further, identification of storage-location-indicative indices facilitate subsequent data retrieval (e.g., upon receipt of a data request) of data elements represented in reports to confirm report accuracies.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, and/or various other storage mediums capable of storing that contain or carry instruction (s) and/or data.

While the principles of the disclosure have been described above in connection with specific apparatuses and methods, it is to be clearly understood that this description is made only by way of example and not as limitation on the scope of the disclosure.

What is claimed is:

1. A stream processing system for processing data streams in accordance with protocols so as to selectively transmit data from a plurality of sources to destination addresses, the stream processing system comprising:
    an input interface that receives data streams, each data stream including a plurality of data elements and having been transmitted by at least one device from a plurality of devices, where access to data retained by the stream processing system by at least one other device of the plurality of devices is based on subscription for the access;
    a scheduler comprising a first set of one or more stream processors corresponding to one or more stream engines to facilitate assigning individually each data stream of the data streams to one or more processing nodes of a plurality of processing nodes comprising a second set of one or more stream processors, where the scheduler for a first data stream of the data streams and a second data stream of the data streams, detects that a first report protocol and a second report protocol apply to the first data stream and the second data stream,
    the first report protocol specifying:
        a first set of one or more composites;
        a first set of one or more reporting triggers; and
        a first set of one or more destination addresses associated with a first subset of one or more devices from the plurality of devices; and
    the second report protocol specifying:
        a second set of one or more composites;
        a second set of one or more reporting triggers; and
        a second set of one or more destination addresses associated with a second subset of one or more devices from the plurality of devices;
    assigns the first data stream and the second data stream to the one or more processing nodes of the plurality of processing nodes based on the first report protocol and the second report protocol, the plurality of processing nodes to perform composite monitoring, value assessment, and/or report generation functions;
    the one or more processing nodes to determine whether data elements in the first data stream and/or the second data stream include: a particular composite from the first set of one or more composites specified in the first report protocol having values consistent with one or more values specified in the first report protocol, and/or a different composite from the second set of one or more composites specified in the second report protocol having values consistent with one or more values specified in the second report protocol; and
    a reporting node that:
        responsive to at least one trigger from the first set of one or more reporting triggers:
            retrieves a first set of information for each data element in the first data stream and/or the second data stream for which it was determined to include a value associated with the particular composite that is consistent with the one or more values specified in the first report protocol;
            identifies at least one destination address from the first set of one or more destination addresses associated with the first subset of one or more devices from the plurality of devices indicated in the first report protocol; and
            transmits, to the at least one destination address from the first set of one or more destination addresses, the retrieved first set of information; and
        responsive to at least one trigger from the second set of one or more reporting triggers:
            retrieves a second set of information for each data element in the first data stream and/or the second data stream for which it was determined to include a value associated with the different composite that is consistent with the one or more values specified in the second report protocol;
            identifies at least one destination address from the second set of one or more destination addresses associated with the second subset of one or more devices from the plurality of devices indicated in the second report protocol; and
            transmits, to the at least one destination address from the second set of one or more destination addresses, the retrieved second set of information.

2. The stream processing system for processing data streams in accordance with protocols so as to selectively transmit data from a plurality of sources to destination addresses as recited in claim 1, wherein the stream processing system is included in a network of communicably interconnected devices, and the first subset of one or more devices from the plurality of devices and the second subset of one or more devices from the plurality of devices are external to the network of communicably interconnected devices.

3. The stream processing system for processing data streams in accordance with protocols so as to selectively transmit data from a plurality of sources to destination addresses as recited in claim 2, wherein the reporting node further:

filters the first set of information in accordance with a first filtering process specified in the first report protocol to result in a first reduction in information precision, and filters the second set of information in accordance with a second filtering process specified in the second report protocol to result in a second reduction in information precision that is different from the first reduction in information precision with respect to a degree of identification of a subject associated with respectively filtered information, wherein the transmitting the retrieved first set of information and/or the retrieved second set of information includes transmitting the respectively filtered information.

4. The stream processing system for processing data streams in accordance with protocols so as to selectively transmit data from a plurality of sources to destination addresses as recited in claim 1, wherein the one or more processing nodes cache information associated with the data elements determined to include the particular composite from the first set of one or more composites specified in the first report protocol having the values consistent with the one or more values specified in the first report protocol and/or the different composite from the second set of one or more composites specified in the second report protocol having the values consistent with the one or more values specified in the second report protocol.

5. The stream processing system for processing data streams in accordance with protocols so as to selectively transmit data from a plurality of sources to destination addresses as recited in claim 4, wherein the reporting node retrieves from cache the information associated with the data elements determined to include the particular composite from the first set of one or more composites specified in the first report protocol having the values consistent with the one or more values specified in the first report protocol and/or the different composite from the second set of one or more composites specified in the second report protocol having the values consistent with the one or more values specified in the second report protocol.

6. The stream processing system for processing data streams in accordance with protocols so as to selectively transmit data from a plurality of sources to destination addresses as recited in claim 1, wherein the reporting node transmits, to the at least one destination address from the first set of one or more destination addresses, the retrieved first set of information at a first time according to the first report protocol, and transmits, to the at least one destination address from the second set of one or more destination addresses, the retrieved second set of information at a second time according to the second report protocol, wherein the first time is different from the second time.

7. The stream processing system for processing data streams in accordance with protocols so as to selectively transmit data from a plurality of sources to destination addresses as recited in claim 6, wherein the reporting node transmits, to the at least one destination address from the first set of one or more destination addresses, the retrieved first set of information in a first format according to the first report protocol, and transmits, to the at least one destination address from the second set of one or more destination addresses, the retrieved second set of information in a second format according to the second report protocol, wherein the first format is different from the second format.

8. The stream processing system for processing data streams in accordance with protocols so as to selectively transmit data from a plurality of sources to destination addresses as recited in claim 1, wherein the one or more processing nodes further:

extract dates from at least some of the data elements; and determine whether each date is within a date range respectively specified in the first report protocol and/or the second report protocol, wherein it is determined whether the respective data element includes the respective particular composite when it is determined that the date is within the respective date range.

9. The stream processing system for processing data streams in accordance with protocols so as to selectively transmit data from a plurality of sources to destination addresses as recited in claim 1, wherein:

the one or more values specified in the first report protocol include a first threshold, the one or more values specified in the second report protocol include a second threshold, the determining of consistency with the one or more values specified in the first report protocol is based on whether the first threshold is satisfied; and the determining of consistency with the one or more values specified in the second report protocol is based on whether the second threshold is satisfied.

10. The stream processing system for processing data streams in accordance with protocols so as to selectively transmit data from a plurality of sources to destination addresses as recited in claim 1, wherein:

the transmitting, to the at least one destination address from the first set of one or more destination addresses, corresponds to a single communication for all the data elements in the first data stream and/or the second data stream for which it was determined to include a value associated with the particular composite that is consistent with the one or more values specified in the first report protocol; and the transmitting, to the at least one destination address from the second set of one or more destination addresses, corresponds to another single communication for all the data elements in the first data stream and/or the second data stream for which it was determined to include a value associated with the different composite that is consistent with the one or more values specified in the second report protocol.

11. A method for stream processing system for processing data streams in accordance with protocols so as to selectively transmit data from a plurality of sources to destination addresses, the method comprising:

receiving data streams, each data stream including a plurality of data elements and having been transmitted by at least one device from a plurality of devices, where access to data retained by the stream processing system by at least one other device of the plurality of devices is based on subscription for the access;

assigning individually each data stream of the data streams to one or more processing nodes of a plurality of processing nodes comprising a second set of one or more stream processors;

for a first data stream of the data streams and a second data stream of the data streams, detecting that a first report protocol and a second report protocol apply to the first data stream and the second data stream, the first report protocol specifying:
a first set of one or more composites;
a first set of one or more reporting triggers; and a first set of one or more destination addresses associated with a first subset of one or more devices from the plurality of devices; and the second report protocol specifying:
a second set of one or more composites;
a second set of one or more reporting triggers; and
a second set of one or more destination addresses associated with a second subset of one or more devices from the plurality of devices;

wherein the assigning the first data stream and the second data stream to the one or more processing nodes of the plurality of processing nodes based on the first report protocol and the second report protocol, the plurality of processing nodes to perform composite monitoring, value assessment, and/or report generation functions;

determining whether data elements in the first data stream and/or the second data stream include: a particular composite from the first set of one or more composites specified in the first report protocol having values consistent with one or more values specified in the first report protocol, and/or a different composite from the second set of one or more composites specified in the second report protocol having values consistent with one or more values specified in the second report protocol; and responsive to at least one trigger from the first set of one or more reporting triggers:
retrieving a first set of information for each data element in the first data stream and/or the second data stream for which it was determined to include a value associated with the particular composite that is consistent with the one or more values specified in the first report protocol;

identifying at least one destination address from the first set of one or more destination addresses associated with the first subset of one or more devices from the plurality of devices indicated in the first report protocol; and transmitting, to the at least one destination address from the first set of one or more destination addresses, the retrieved first set of information; and responsive to at least one trigger from the second set of one or more reporting triggers:
retrieving a second set of information for each data element in the first data stream and/or the second data stream for which it was determined to include a value associated with the different composite that is consistent with the one or more values specified in the second report protocol;

identifying at least one destination address from the second set of one or more destination addresses associated with the second subset of one or more devices from the plurality of devices indicated in the second report protocol; and transmitting, to the at least one destination address from the second set of one or more destination addresses, the retrieved second set of information.

12. The method for processing data streams in accordance with protocols so as to selectively transmit data from a plurality of sources to destination addresses as recited in claim 11, wherein the method is performed by a stream processing system that is included in a network of communicably interconnected devices, and the first subset of one or more devices from the plurality of devices and the second subset of one or more devices from the plurality of devices are external to the network of communicably interconnected devices.

13. The method for processing data streams in accordance with protocols so as to selectively transmit data from a plurality of sources to destination addresses as recited in claim 12, further comprising:
filtering the first set of information in accordance with a first filtering process specified in the first report protocol to result in a first reduction in information precision, and
filtering the second set of information in accordance with a second filtering process specified in the second report protocol to result in a second reduction in information precision that is different from the first reduction in information precision with respect to a degree of identification of a subject associated with respectively filtered information,
wherein the transmitting the retrieved first set of information and/or the retrieved second set of information includes transmitting the respectively filtered information.

14. The method for processing data streams in accordance with protocols so as to selectively transmit data from a plurality of sources to destination addresses as recited in claim 11, further comprising:
caching information associated with the data elements determined to include the particular composite from the first set of one or more composites specified in the first report protocol having the values consistent with the one or more values specified in the first report protocol and/or the different composite from the second set of one or more composites specified in the second report protocol having the values consistent with the one or more values specified in the second report protocol.

15. The method for processing data streams in accordance with protocols so as to selectively transmit data from a plurality of sources to destination addresses as recited in claim 14, further comprising:
the retrieving comprises retrieving from cache the information associated with the data elements determined to include the particular composite from the first set of one or more composites specified in the first report protocol having the values consistent with the one or more values specified in the first report protocol and/or the different composite from the second set of one or more composites specified in the second report protocol having the values consistent with the one or more values specified in the second report protocol.

16. The method for processing data streams in accordance with protocols so as to selectively transmit data from a plurality of sources to destination addresses as recited in claim 11, wherein:
the transmitting, to the at least one destination address from the first set of one or more destination addresses, comprises transmitting the retrieved first set of information at a first time according to the first report protocol; and
the transmitting, to the at least one destination address from the second set of one or more destination addresses, comprises transmitting the retrieved second set of information at a second time according to the second report protocol, wherein the first time is different from the second time.

17. The method for processing data streams in accordance with protocols so as to selectively transmit data from a plurality of sources to destination addresses as recited in claim 16, wherein the retrieved first set of information is transmitted in a first format according to the first report protocol, and the retrieved second set of information is transmitted in a second format according to the second report protocol, wherein the first format is different from the second format.

18. The method for processing data streams in accordance with protocols so as to selectively transmit data from a plurality of sources to destination addresses as recited in claim 11, further comprising:
    extracting dates from at least some of the data elements; and
    determining whether each date is within a date range respectively specified in the first report protocol and/or the second report protocol, wherein it is determined whether the respective data element includes the respective particular composite when it is determined that the date is within the respective date range.

19. The method for processing data streams in accordance with protocols so as to selectively transmit data from a plurality of sources to destination addresses as recited in claim 11, wherein:
    the one or more values specified in the first report protocol include a first threshold,
    the one or more values specified in the second report protocol include a second threshold,
    the determining of consistency with the one or more values specified in the first report protocol is based on whether the first threshold is satisfied; and
    the determining of consistency with the one or more values specified in the second report protocol is based on whether the second threshold is satisfied.

20. The method for processing data streams in accordance with protocols so as to selectively transmit data from a plurality of sources to destination addresses as recited in claim 11, wherein:
    the transmitting, to the at least one destination address from the first set of one or more destination addresses, corresponds to a single communication for all the data elements in the first data stream and/or the second data stream for which it was determined to include a value associated with the particular composite that is consistent with the one or more values specified in the first report protocol; and
    the transmitting, to the at least one destination address from the second set of one or more destination addresses, corresponds to another single communication for all the data elements in the first data stream and/or the second data stream for which it was determined to include a value associated with the different composite that is consistent with the one or more values specified in the second report protocol.

* * * * *